(12) United States Patent
Jo et al.

(10) Patent No.: US 10,340,622 B2
(45) Date of Patent: Jul. 2, 2019

(54) INPUT-OUTPUT PORT AND MOBILE TERMINAL HAVING THE SAME

(71) Applicant: LG ELECTRONICS INC., Seoul (KR)

(72) Inventors: Junghyun Jo, Seoul (KR); Minbok Lee, Seoul (KR); Sunglyong Cha, Seoul (KR); Hyunsu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/953,959

(22) Filed: Apr. 16, 2018

(65) Prior Publication Data

US 2019/0115681 A1   Apr. 18, 2019

Related U.S. Application Data

(60) Provisional application No. 62/572,555, filed on Oct. 15, 2017.

(30) Foreign Application Priority Data

Feb. 13, 2018   (KR) .................... 10-2018-0018087

(51) Int. Cl.
*H01R 13/506* (2006.01)
*H01R 24/62* (2011.01)
*H04B 1/3888* (2015.01)
*H01R 13/41* (2006.01)
(Continued)

(52) U.S. Cl.
CPC .......... *H01R 13/506* (2013.01); *H01R 13/41* (2013.01); *H01R 24/62* (2013.01); *H04B 1/3888* (2013.01); *H01R 2107/00* (2013.01); *H04B 2001/3894* (2013.01)

(58) Field of Classification Search
CPC ........................ H01R 24/28; H04M 1/72527
See application file for complete search history.

(56) References Cited

U.S. PATENT DOCUMENTS 6,791,825 B1 *  9/2004  Taylor ................... G06F 1/1626
                                                      361/679.6
7,922,535 B1 *  4/2011  Jiang .................. H01R 13/5205
                                                       439/271
(Continued)

*Primary Examiner* — Cindy Trandai
(74) *Attorney, Agent, or Firm* — Birch, Stewart, Kolasch & Birch, LLP

(57) ABSTRACT

An input-output port is disclosed. The input-output port of the present invention may comprise: a housing including: a first opening; a second opening being spaced apart from the first opening; and a hollow portion being communicated with the first and second openings; a frame having a shape of a plate, the frame being positioned in the hollow portion; a body being combined with the frame: a first body being positioned in the hollow portion, adjacent to the first opening; and a second body being spaced apart from the first body, positioned in the hollow portion, adjacent to the second opening; a pin being accommodated in the body, the pin including: a first portion being accommodated in the first body, exposed on the first body; and a second portion being accommodated in the second body, exposed on the second body; and a packing unit being positioned between the first and second bodies, the packing unit being combined with the frame.

14 Claims, 21 Drawing Sheets

(51) Int. Cl.
*H04B 1/38* (2015.01)
*H01R 107/00* (2006.01)

(56) References Cited

U.S. PATENT DOCUMENTS

| | | | | | |
|---|---|---|---|---|---|
| 2010/0328906 | A1* | 12/2010 | Tsai | ..................... | H05K 5/061 |
| | | | | | 361/752 |
| 2012/0015549 | A1* | 1/2012 | Youn | ................ | H01R 13/65802 |
| | | | | | 439/374 |
| 2013/0065442 | A1* | 3/2013 | Nagata | .............. | H01R 13/5202 |
| | | | | | 439/607.58 |
| 2013/0265715 | A1* | 10/2013 | Bae | ........................ | H04M 1/18 |
| | | | | | 361/679.55 |
| 2015/0155661 | A1* | 6/2015 | Chen | ................. | H01R 13/6582 |
| | | | | | 439/607.01 |
| 2015/0188259 | A1* | 7/2015 | Chen | ................ | B29C 45/14639 |
| | | | | | 439/607.01 |
| 2016/0020549 | A1* | 1/2016 | Chen | ................. | H01R 13/5219 |
| | | | | | 439/78 |
| 2016/0149337 | A1* | 5/2016 | Ozaki | ............... | H01R 13/5219 |
| | | | | | 439/529 |
| 2017/0194735 | A1* | 7/2017 | Arai | ................. | H01R 13/6587 |
| 2018/0031924 | A1* | 2/2018 | Yoo | .................. | G02F 1/133308 |
| 2018/0287290 | A1* | 10/2018 | Kifune | ................. | H01R 13/504 |

* cited by examiner

INPUT-OUTPUT PORT AND MOBILE TERMINAL HAVING THE SAME

This application claims the benefit of U.S. Application No. US62/572,555 filed on Oct. 15, 2017, and Korean Patent Application No. 10-2018-0018087 filed on Feb. 13, 2018, the entire contents of which are incorporated herein by reference for all purposes as if fully set forth herein.

BACKGROUND OF THE INVENTION

Field of the Invention

The present invention relates to an input-output port and a mobile terminal having the same. In particular, the present invention relates the mobile terminal of which input-output port is water-proved.

Discussion of the Related Art

A terminal may be categorized into a mobile/portable terminal or a stationary terminal depending on whether the terminal is movable. The mobile terminal may be categorized into a handheld terminal or a vehicle mounted terminal according to whether the user can carry the mobile phone directly.

The functions of mobile terminals have been diversified. For example, the functions of mobile terminals are: communication of data and voice, photographing and video shooting through a camera, voice recording, music file playback through a speaker system, and outputting an image or video to a display unit. Some mobile terminals are equipped with an electronic game play function or a multimedia player function. In particular, mobile terminals may receive multicast signals that provide visual content such as broadcast and video or television programs.

Such a terminal has been a multimedia player having a complex function such as photographing or video shooting, playback of music or video file.

For supporting and increasing the functionality of such terminals, it is contemplated to improve the structural and/or software aspects of the terminal.

Recently, a mobile terminal capable of waterproof has been released. In particular, a configuration for a waterproof function for an input-output port can be applied to the mobile terminal.

SUMMARY OF THE INVENTION

Accordingly, an object of the present invention is to address the above-described and other problems.

Another object of the present invention is to provide a mobile terminal of which input-output port is waterproof.

Another object of the present invention is to the mobile terminal of which USB port is waterproof.

According to an aspect of the present invention, there is provided an input-output port, comprising: a housing including: a first opening; a second opening being spaced apart from the first opening; and a hollow portion being communicated with the first and second openings; a frame having a shape of a plate, the frame being positioned in the hollow portion; a body being combined with the frame: a first body being positioned in the hollow portion, adjacent to the first opening; and a second body being spaced apart from the first body, positioned in the hollow portion, adjacent to the second opening; a pin being accommodated in the body, the pin including: a first portion being accommodated in the first body, exposed on the first body; and a second portion being accommodated in the second body, exposed on the second body; and a packing unit being positioned between the first and second bodies, the packing unit being combined with the frame.

According to another aspect of the present invention, the packing unit may include: a core being positioned between the first body and the second body; and a protrusion protruding from the core, the protrusion being in contact with the housing.

According to another aspect of the present invention, the packing unit may further include a depression being recessed inwardly from the core, and the depression may be positioned between the protrusion and the second body.

According to another aspect of the present invention, the first body may include a first contact portion accommodated in the housing, the first contact portion being adjacent to the packing unit, the second body may include a second contact portion accommodated in the housing, the second contact portion being adjacent to the packing unit, and the packing unit may be positioned between the first contact portion and the second contact portion.

According to another aspect of the present invention, the depression may be recessed and form a stepped portion with reference to the second contact portion.

According to another aspect of the present invention, the frame may include: a first frame being coupled to the first body, the first frame being adjacent to the first opening; a second frame being coupled to the first body, the second frame being positioned between the first frame and the second body; and a frame hole being formed between the first frame and the second frame.

According to another aspect of the present invention, the first body may include: a first upper body being located at upper side of the frame; and a first lower body being located at lower side of the frame, and the first upper body may be connected to the first lower body through the frame hole.

According to another aspect of the present invention, the frame may include: a first leg being extended from the second frame toward the second body, the first leg being coupled to the second body; and a second leg being extended from the second frame toward the second body, the second leg being coupled to the second body, the second leg being spaced apart from the first leg.

According to another aspect of the present invention, the pin may be positioned between the first leg and the second leg.

According to another aspect of the present invention, the second body may include: a first stopper being adjacent to the first leg, the first stopper being positioned at an outside of the second opening; and a second stopper being adjacent to the second leg, the second stopper being positioned at the outside of the second opening, the second stopper being spaced apart from the first stopper.

According to another aspect of the present invention, the second body may include a first beam, and wherein the first beam couples the first stopper with the second stopper.

According to another aspect of the present invention, the housing may include: a housing body forming the hollow portion; and a housing coupling portion being extended from the housing body, the housing coupling portion being adjacent to the second opening, the housing coupling portion being coupled to the second body.

According to another aspect of the present invention, the housing coupling portion may include a latch extended from the housing body, the latch may include: a extension portion being extended from the housing body in a first direction;

and a bending portion being bent from the extension portion, the first direction may be a direction from the first body toward the second body, and the latch may hook the second contact portion.

According to another aspect of the present invention, the latch may include: a first latch being extended from the housing body; and a second latch being extended from the housing body, the second latch being positioned opposite to the first latch.

According to another aspect of the present invention, the housing body may include first and second grooves being recessed at the second opening in a second direction, the latch may be positioned between the first groove and the second groove, and the second direction may be a direction from the second body toward the first body.

According to another aspect of the present invention, the housing coupling portion may include a second coupling portion, the second coupling portion may include: a guide being extended from the second opening in a first direction; and a housing hole being formed at a boundary between the guide and the housing body, the second body may include a coupling protrusion protruding from the second contact portion, the coupling protrusion being fitted in the housing hole, and the first direction may be a direction from the first body toward the second body.

According to another aspect of the present invention, the coupling protrusion may include: a guide surface facing the first body obliquely, the guide surface being extended from the second contact portion; and a rear surface facing the guide, the rear surface being extended from the second contact portion.

According to another aspect of the present invention, the second contact portion may include a second contact portion groove being recessed inwardly, and the second contact portion may be adjacent to the coupling protrusion.

According to another aspect of the present invention, the second contact portion groove may be positioned between the packing unit and the coupling protrusion.

According to another aspect of the present invention, there is provided a mobile terminal comprising: a front case; a rear case being coupled to a rear portion of the front case; a display unit being coupled to the front case, the display unit displaying an image forwardly; and the input-output port being coupled to the rear case.

According to at least one of embodiments of the present invention, input-output port of the mobile terminal can be waterproof.

According to at least one of embodiments of the present invention, USB port of the mobile terminal can be waterproof.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
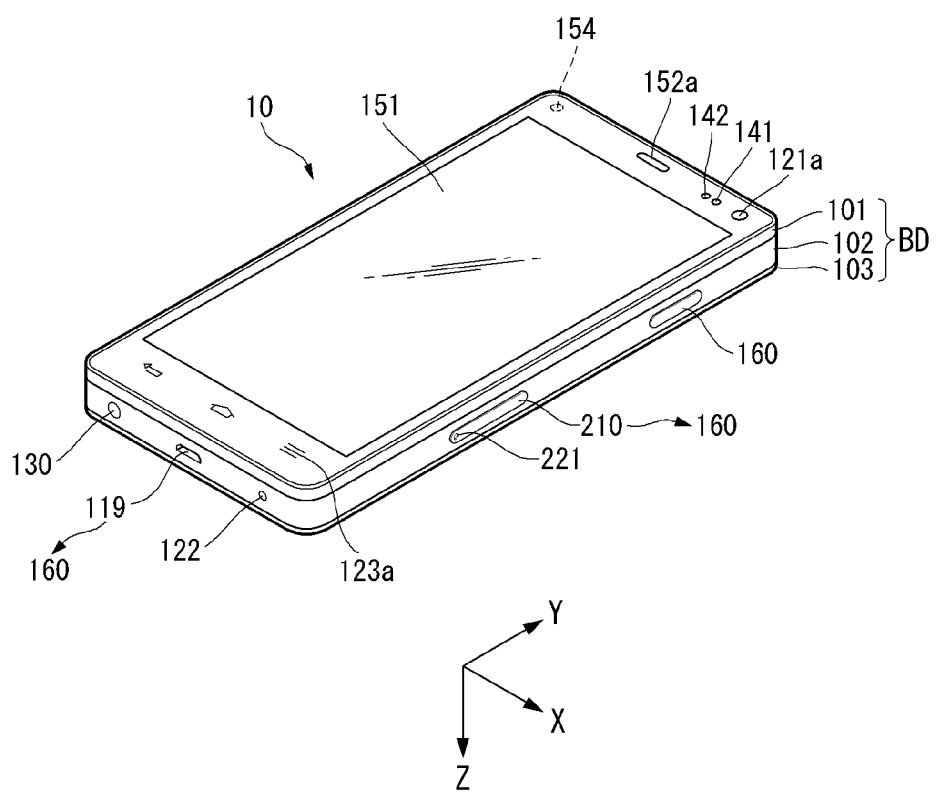
FIGS. 1 and 2 are conceptual diagrams viewing a mobile terminal according to an embodiment of the present invention in different directions.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

The mobile terminal described in this specification includes a mobile phone, a smart phone, a laptop computer, a digital broadcasting terminal, a personal digital assistant (PDA), a portable multimedia player (PMP), a slate PC, a tablet PC, an ultrabook, and a wearable device (such as a smartwatch, a smart glass, and a head mounted display (HMD)).

However, it could be understood by those skilled in the art that the configuration according to the embodiments described herein may be applied to fixed terminals such as a digital TV, a desktop computer, a digital signage, and the like.

The coordinate system used in the present specification is a Cartesian coordinate system as an orthogonal coordinate system. For example, the coordinate system used in this specification is an XYZ coordinate system. In this specification, the XYZ coordinate system is the left handed direction. In other words, when index finger to little finger of the left hand are wound from the X axis to the Y axis, the direction indicated by the thumb becomes the Z axis.

Figure 2:
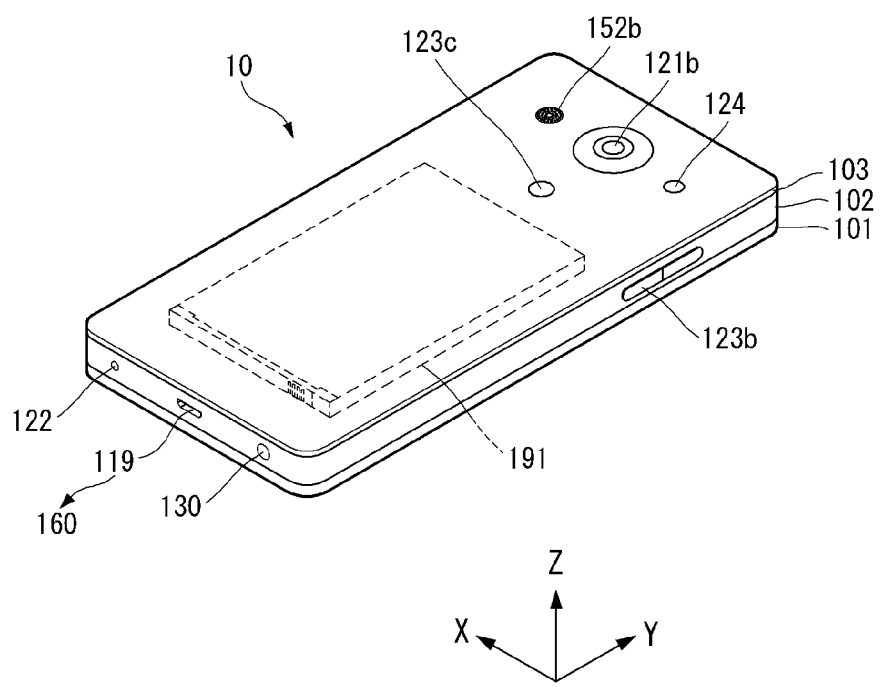

FIGS. 1 and 2 are conceptual diagrams viewing a mobile terminal according to an embodiment of the present invention in different directions.

Referring to FIGS. 1 and 2, the disclosed mobile terminal 10 includes a bar-shaped body. However, the present invention is not limited thereto, and may be applied to various structures such as a watch type, a clip type, or a glass type. The present invention may be applied various structures in which two or more bodies are movably coupled, such as a folder type, a flip type, a slide type, a swing type, and a swivel type. A description of a particular type of mobile terminal, although relevant to a particular type of mobile terminal, is generally applicable to other types of mobile terminals.

Here, the body of the terminal may be understood as a concept of referring to the mobile terminal 10 as at least one aggregate.

The mobile terminal 10 may include a case (for example, a frame, a housing, a cover, etc.) which forms an appearance. As shown, the mobile terminal 10 may include a front case 101 and a rear case 102. Various electronic components are disposed in the inner space formed by the front case 101 and the rear case 102. At least one middle case may be additionally disposed between the front case 101 and the rear case 102.

A display unit 151 may be disposed on a front surface of the terminal body to output information. The window 151a of the display unit 151 may be mounted on the front case 101 to form a front surface of the terminal body together with the front case 101.

In some cases, electronic components may also be mounted on the rear case 102. The electronic components that are available to be mounted on the rear case 102 include a detachable battery, an identification module, a memory card, and the like. In this case, a rear cover 103 for covering the mounted electronic component may be detachably coupled to the rear case 102. Therefore, when the rear cover 103 is separated from the rear case 102, the electronic components mounted on the rear case 102 may be exposed to the outside.

When the rear cover 103 is coupled to the rear case 102, a lateral portion of the rear case 102 may be exposed. In some cases, the rear case 102 may be completely covered by the rear cover 103, when the rear case 102 and the rear cover 103 are coupled. Meanwhile, the rear cover 103 may be provided with an opening for exposing the camera 121b and the sound output unit 152b.

These cases 101, 102, and 103 may be formed by injection molding of synthetic resin or may be formed of metal such as stainless steel (STS), aluminum (Al), titanium (Ti), or the like.

The mobile terminal 10 may be configured such that one case provides the inner space, unlike the above example in which a plurality of cases provide an inner space for accommodating various electronic components. In this case, a mobile terminal 10 may have an unibody in which a synthetic resin or a metal is connected from the lateral to the rear.

Meanwhile, the mobile terminal 10 may include a waterproof unit (not shown) for preventing water from penetrating into the terminal body. For example, the waterproof unit may be provided with a waterproof member between the window 151a and the front case 101, between the front case 101 and the rear case 102, or between the rear case 102 and the rear cover 103. The waterproof member may seal an inner space formed between them.

The mobile terminal 10 may include the display unit 151, a first and a second audio output unit 152a, 152b, the proximity sensor 141, the illuminance sensor 142, the optical output unit 154, a first and a second cameras 121a, 121b, a first to a third manipulation units 123a, 123b, 123c, the microphone 122, the interface unit 160, and an earphone jack 130.

Hereinafter, as shown in FIGS. 1 and 2, on a front of the terminal body are disposed the display unit 151, the first audio output unit 152a, the proximity sensor 141, the illuminance sensor 142, the optical output unit 154, the first camera 121a, and the first manipulation unit 123a. On a lateral side of the body are disposed the second manipulation unit 123b, the microphone 122, the earphone jack 130, and the interface unit 160. On a rear side of the body are disposed the second audio output unit 152b, the third manipulation unit 123c, and the second camera 121b. The mobile terminal 10, which includes the front side of the body, the lateral side of the body, and the rear side of the body, may be described as an example.

However, these configurations are not limited to this arrangement. These configurations may be excluded or replaced, or disposed on the other side as needed. For example, the front side of the body may not be provided with the first manipulation unit 123a, and the second audio output unit 152b may be provided on not the rear side of the body but the lateral side of the body.

The body BD of the mobile terminal 10 may include a front case 101, a rear case 102 and a rear cover 103. The rear cover 103 may be integrally formed with the rear case 102. The body BD of the mobile terminal 10 may include a front case 101 and a rear case 102.

The display unit 151 displays (or outputs) information processed by the mobile terminal 10. For example, the display unit 151 may display execution screen information of an application program driven by the mobile terminal 10, or UI (User Interface) and GUI (Graphic User Interface) information according to the execution screen information.

The display unit 151 may include at least one of a liquid crystal display (LCD), a thin film transistor-liquid crystal display (TFT LCD), an organic light-emitting diode (OLED), a flexible display, and a 3D display, an e-ink display.

Further, the display unit 151 may be provided two or more depending on the implementation of the mobile terminal 10. In this case, a plurality of display unit may be spaced apart to one surface or may be disposed integrally, may also be disposed on different surfaces respectively in the mobile terminal 10.

The display unit 151 may include a touch sensor for sensing a touch on the display unit 151 to receive a control command. By using this, when a touch is applied to the display unit 151, the touch sensor senses the touch and a controller may generate a control command corresponding to the touch. Information that is input by the touch may be either a letter or a number, and it may be a specified or indicated menu items in the various modes. The controller may be implemented by some electronic components installed in the body BD. For example, the controller may be implemented by some electronic substrates or boards.

Meanwhile, the touch sensor may be configured as a film type having a touch pattern, and may be arranged between a window of the display unit 151 and a display panel on a rear side of the window of the display unit 151, or may be a metal wire patterned directly on the rear surface of the window of the display unit 151. Alternatively, the touch sensor may be formed integrally with the display unit 151. For example, the touch sensor may be disposed on a substrate of the display unit 151, or may be provided in an interior of the display unit 151.

Like this, the display unit 151 may form a touch screen with the touch sensor. In this case, the touch screen may work as the manipulation unit 123a. In some cases, the touch screen may replace at least some functions of the first manipulation unit 123a.

The first audio output unit 152a may be implemented as a receiver for transmitting the other party's voice to an ear of the user. The second audio output unit 152b may be implemented as a loud speaker for outputting various kinds of alarm sounds or playing sounds of multimedia.

The window of the display unit 151 may form a sound hole for the release of a sound generated from the first audio output unit 152a. However, the present invention is not limited to this. The sound may be released along an assembly gap between structures (for example, a gap between the window of the display unit 151 and the front case 101). In this case, since holes formed independently for sound output are apparently invisible or hidden, the external appearance of the mobile terminal 10 can become much simpler.

The optical output unit 154 may output a light to inform an user of an event occurred. The events may be a message reception, a call signal reception, a missed call, an alarm, event notification, e-mail reception, or an information reception via an application. If the user's confirmation of the event is detected, the controller may control the optical output unit 154 to be terminated.

The first camera 121a may include an image sensor for acquiring an image. The first camera 121a may process an image frame of a still image or a moving image obtained by the image sensor in the photographing mode or the video communication mode. The processed image frame may be displayed on the display unit 151 and can be stored in the memory.

The first to third manipulation units 123a, 123b, 123c may be operated to receive commands for controlling the operation of the mobile terminal 10, and may be collectively referred to as manipulating portion. The first to third manipulation units 123a, 123b, and 123c may be adopted in any way if the way is touch, push, scroll, etc. as tactile manner that is operated while the user is receiving a tactile feel. Further, the first and second manipulation units 123a, 123b may be adopted also in such a way that is operated without the tactile feel of the user through proximity touch and hovering touch, etc. The third manipulation unit 123c may obtain the user's fingerprints with a fingerprint sensor. The obtained fingerprint information may be provided to the controller.

The first manipulation unit 123a may be a touch key as an example, but the present invention is not limited to this. For example, the first manipulation unit 123a may be a mechanical key, or may be composed of a combination of the touch key and the mechanical key.

The information that is input by the first and second manipulation units 123a, 123b may be variously set. For example, the first manipulation unit 123a may receive commands on menu, home key, cancel, search, etc. The second manipulation unit 123b may receive input commands, such as adjusting volume level of sound outputted from the first or the second audio output unit 152a, 152b, and switching to a touch recognition mode of the display unit 151.

Meanwhile, the rear surface of the terminal body may be provided with the third manipulation unit 123c as another example of the user input unit 123. The third manipulation unit 123c is to be manipulated in order to receive a command for controlling an operation of the mobile terminal 10, and information to be input may be variously set. For example, the third manipulation unit 123c may receive input commands, such as on/off of the power supply, start, end, scroll, etc., adjusting volume level of sound outputted from the first or the second audio output unit 152a, 152b, switching to a touch recognition mode of the display unit 151, and acquisition of fingerprint information. A rear input unit may be implemented in the form of a touch input and a push input, or in the form of a combination thereof.

The rear input unit may be disposed to be overlapped with the display unit 151 of the front surface in a thickness direction of the terminal body. For example, the rear input unit may be disposed on the rear upper end of the terminal body so as to be easily manipulated using an index finger when the user squeezes the terminal body with one hand. However, the present invention is not limited to this, and the location of the rear input unit can be changed.

In case the rear input unit is provided on the rear surface of the terminal body, a new type of user interface may be implemented using this. In addition, in case the first manipulation unit 123a is not disposed on the front surface of the terminal body by replacing at least some functions of the first manipulation unit 123a which is provided on the front surface of the terminal body with the previously described touch screen or the rear input unit, the display unit 151 may be configured in a more large screen.

Meanwhile, the mobile terminal 10 may be provided with a fingerprint recognition sensor to recognize fingerprints of the user, and the controller 180 may use the fingerprint information detected by the fingerprint recognition sensor as an authentication means. The fingerprint recognition sensor may be embedded in the display unit 151 or the user input unit 123.

The microphone 122 may be made to be provided with a user's voice, other sound and so on. The microphone 122 may be provided in a plurality of locations and may be configured to get a stereo sound.

The interface unit 160 may be a passage that can connect the mobile terminal 10 to an external device. For example, the interface unit 160 may be at least one of connection terminals for connection to another device (for example, an earphone, an external speaker), ports for short-range communication [for example, an infrared port (IrDA Port), a Bluetooth port, a wireless LAN Port, etc.], or power supply terminals for supplying power to the mobile terminal 10.

The interface unit 160 may be implemented as a socket for receiving an external card such as a SIM (Subscriber Identification Module) or a UIM (User Identity Module) or a memory card for storing information. For example, as shown in FIG. 1, the interface unit 160 may include a SIM tray 210 and an input-output port 119. The SIM tray 210 can load a SIM card. The SIM tray 210 can be moved to the inside or outside of the mobile terminal 10 for replacement and/or replacement of a SIM card. The input-output port 119 may be a path for electric power to be provided to the mobile terminal 10. The input-output port 119 can be connected to an external terminal or an external electronic device, and can be an input-output path for information and electric signals. The inputoutput port 119 may be connected to an external terminal. For example, the input-output port 119 may be connected to an external USB terminal. In this case, the input-output port 119 may be referred to as a USB port 119.

The second camera 121b may be disposed on the rear surface of the terminal body. In this case, the second camera 121b may shoot in opposite direction in comparison with the first camera 121a.

The second camera 121b may include a plurality of lenses that are arranged along at least one line. The plurality of lenses may be arranged in matrix form. These cameras may be referred to as 'array camera'. When the second camera 121b is configured by an array camera, it is possible to take images in a variety of ways using the plurality of lenses, and to obtain a better quality image.

A flash 124 may be disposed adjacent to the second camera 121b. The flash 124 may illuminate light toward an object when the second camera 121b is for shooting the object.

The second audio output unit 152b may be additionally disposed in the body BD. The second audio output unit 152b may implement a stereo function together with the first audio output unit 152a, and may be used for the implementation of a speakerphone mode during a call.

The body BD may be provided with at least one antenna for a wireless communication. The antenna may be embedded in the body BD or may be formed on the body BD. For example, an antenna that is part of a broadcast receiving module, may be configured to be drawn out from the body BD. Alternatively, the antenna may be formed in a film type and may be attached to an inner surface of the rear cover 103. A case comprising a conductive material may work as an antenna.

The body BD may be provided with a power supply unit on purpose of supplying an electric power to the mobile terminal 10. The power supply unit may be embedded in the body BD or may include a battery 191 which is detachable.

The battery 191 may be configured to be provided with the electric power via power cable connected to the interface unit 160. Further, the battery 191 may be configured to be charged by using wireless-charger. The wireless charging may be implemented by magnetic induction or resonance manner (magnetic resonance scheme).

Meanwhile, referring to the FIGS. 1 and 2, the rear cover 103 may be coupled to the rear case 102 to cover the battery 191 and may prevent separation of the battery 191 and may protect the battery 191 from an external impact and foreign matter. When the battery 191 is configured to be detachable on the terminal body, the rear cover 103 may be detachably coupled to the rear case 102.

An accessory to protect an appearance of the mobile terminal 10 or to assist or extend a function of the mobile terminal 10 may be added to the mobile terminal 10. An example of the accessory may be a cover to cover at least one surface of the mobile terminal 10 or a pouch to accommodate at least one surface of the mobile terminal 10. The cover or the pouch may be configured to extend the function of the mobile terminal 10 by interacting with the display unit 151. Another example of the accessory may be a touch pen to assist or extend a touch input on the touch screen.

Figure 3:
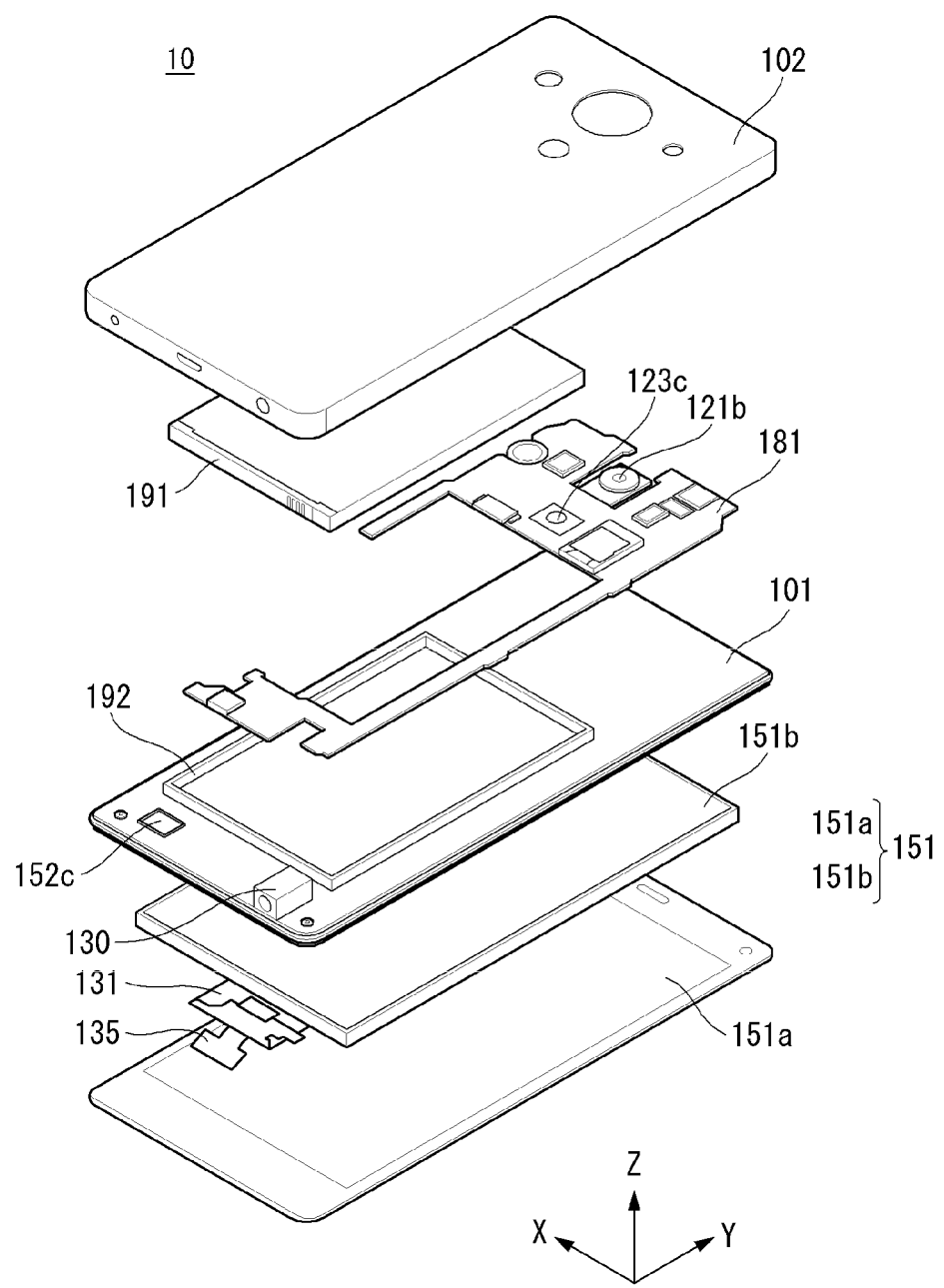
FIG. 3 is an exploded perspective view of the mobile terminal of FIG. 1.

FIG. 3 is an exploded perspective view of the mobile terminal of FIG. 1. The rear case 102 of the mobile terminal 10 may be integrally formed with the rear cover 103 (see FIG. 1). When the rear case 102 is integrally formed with the rear cover 103 (see FIG. 1), at least a part of the rear case 102 may be easily made of metal. When the rear case 102 is integrally formed with the rear cover 103 (see FIG. 1), it can be advantageous in securing the rigidity of the rear case 102.

The front case 101 may be fastened to the rear case 102. Electronic components may be disposed between the front case 101 and the rear case 102. When the front case 101 is fastened to the rear case 102, the electronic parts located inside the mobile terminal 10 may not be exposed to the outside. A battery 191, a main circuit board 181, an acoustic output unit 152c, and an earphone jack 130 may be disposed on the rear surface of the front case 101. A third manipulation unit 123c capable of obtaining fingerprint information may be connected to the main circuit board 181.

The rear case 102 may provide a space in which the electronic components can be seated. The rear case 102 may form at least a part of the rear surface of the mobile terminal 10. The rear case 102 may form at least a part of the lateral surface of the mobile terminal 10.

The display unit 151 may include a window 151a and a display panel 151b. A touch circuit board 135 and a display circuit board 131 may be connected to the display panel 151b. The display unit 151 may be accommodated in the front case 101. The touch circuit board 135 and the display circuit board 131 may be connected to the main circuit board 181. The battery accommodating portion 192 may be formed on the rear surface of the front case 101 and receive the battery 191.

Figure 4:
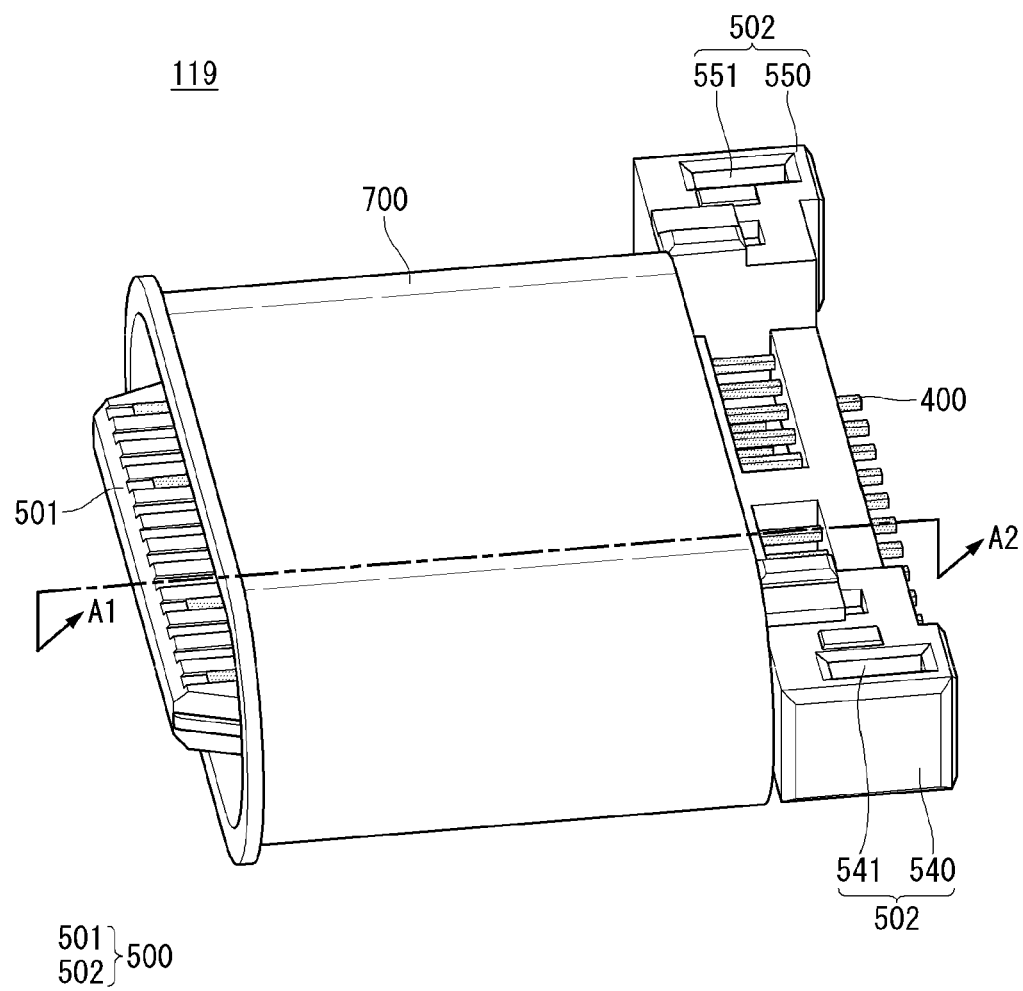
FIG. 4 is a perspective view of an input-output port 119 according to an embodiment of the present invention.

FIG. 4 is a perspective view of an input-output port 119 according to an embodiment of the present invention. The input-output port 119 may include an input-output port body 500 and a housing 700. The input-output port body 500 may be referred to as a USB body 500 or a body 500. The housing 700 may form a hollow portion. The housing 700 may form an opening. The opening formed in the housing 700 may include a first opening and a second opening. The hollow portion of the housing 700 can be connected to the first and second openings of the housing 700.

The body 500 can be coupled with the housing 700. The body 500 may be inserted into the housing 700. At least a portion of the body 500 may be located within the housing 700.

The body 500 may include a first body 501 and a second body 502. The first body 501 may be connected to the second body 502. The connecting portion of the first body 501 and the second body 502 may be located in the hollow portion of the housing 700. The first body 501 can be connected to the second body 502 by a frame 300 (see FIG. 6).

The first body 501 may be positioned in the hollow portion of the housing 700. A portion of the second body 502 may be located outside the housing 700. The second body 502 may include a first stopper 540 and a second stopper 550. The first stopper 540 may be spaced apart from the second stopper 550.

The first fixing portion 541 may be formed at the first stopper 540. The second fixing portion 551 may be formed at the second stopper 550. The fixing portions 541 and 551 may mean at least one of the first fixing portion 541 and the second fixing portion 551. The fixing portions 541 and 551 may be a groove or an opening. The fixing portions 541 and 551 can be coupled to the case. The fixing portions 541 and 551 can be, for example, coupled to the rear case 102 (see FIGS. 1 to 3).

The input-output port 119 may include an input-output pin 400. The input-output pin 400 may be referred to as a USB pin 400 or a pin 400. The pin 400 may pass through the body 500. The pin 400 may pass through the second opening of the housing 700, from the outside of the housing 700 toward the hollow portion of the housing 700. The pin 400 may pass through the hollow portion of the housing 700, from the second opening of the housing 700 toward the first opening of the housing 700. A plurality of pins 400 may be provided. The plurality of pins 400 may be conductive. For example, the pin 400 may comprise a metal.

Figure 5:
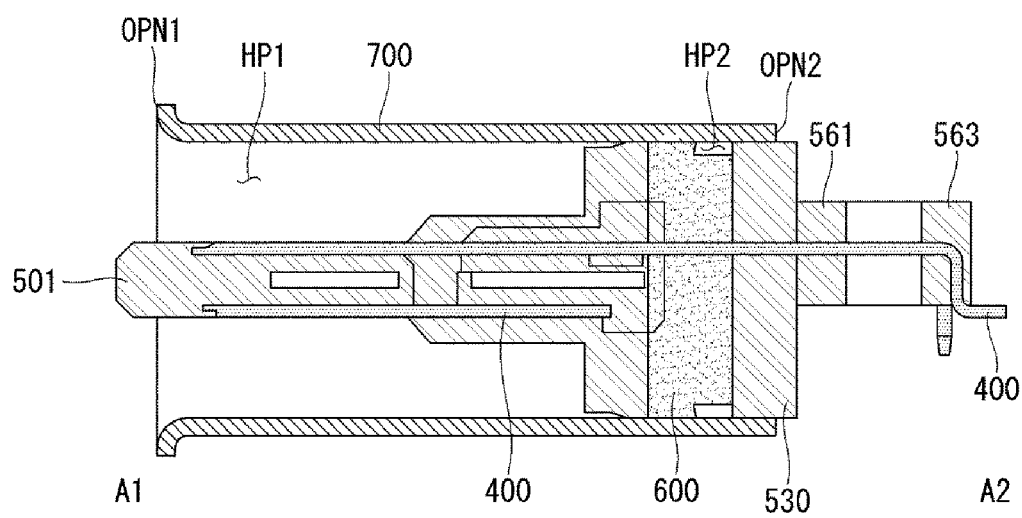
FIG. 5 is a cross-sectional view of the input-output port 119 taken along the line A1-A2 of FIG. 4.

FIG. 5 is a cross-sectional view of the input-output port 119 taken along the line A1-A2 of FIG. 4.

Referring to FIG. 5, the first opening OPN1 of the housing 700 may refer to an opening OPN1 adjacent to the first body 501. The second opening OPN2 of the housing 700 may mean the opening OPN2 adjacent to the second body 502. The front portion of the input-output port 119 may refer to a portion adjacent to the first opening OPN1. The rear portion of the input-output port 119 may refer to a portion adjacent to the second opening OPN2. The direction from the first opening OPN1 toward the second opening OPN2 may be referred to as a rearward direction or a first direction. The direction from the second opening OPN2 toward the first opening OPN1 may be referred to as a forward direction or a second direction. The first direction may be opposite to the second direction.

The input-output port 119 may include a packing unit 600. The packing unit 600 may be located in the hollow portion HP of the housing 700. The packing unit 600 may be positioned between the first body 501 and the second body 502. The packing unit 600 may connect the first body 501 and the second body 502.

The pin 400 may pass through the packing unit 600. The pin 400 may be disposed on the upper surface of the first body 501. The pin 400 may be disposed on the lower surface of the first body 501. Or the pin 400 may be disposed on the upper surface and the lower surface of the first body 501.

The packing unit 600 can be brought into close contact with the inner surface of the housing 700. The packing unit 600 can compartize the hollow part HP of the housing 700. For example, the hollow portion HP of the housing 700 can be divided into the first hollow portion HP1 and the second hollow portion HP2 by the packing unit 600. The first hollow portion HP1 may be connected to the first opening OPN1. The second hollow portion HP2 may be connected to the second opening portion OPN2.

The first hollow portion HP1 can be spaced apart from the second hollow portion HP2 by the packing unit 600. The matter which flows from the first opening OPN1 through the first hollow portion HP1 toward the second hollow portion HP2 can be shielded by the packing unit 600. For example, the packing unit 600 can shield water or fine dirt which flows from the first opening OPN1 through the first hollow portion HP1 toward the second hollow portion HP2.

Figure 6:
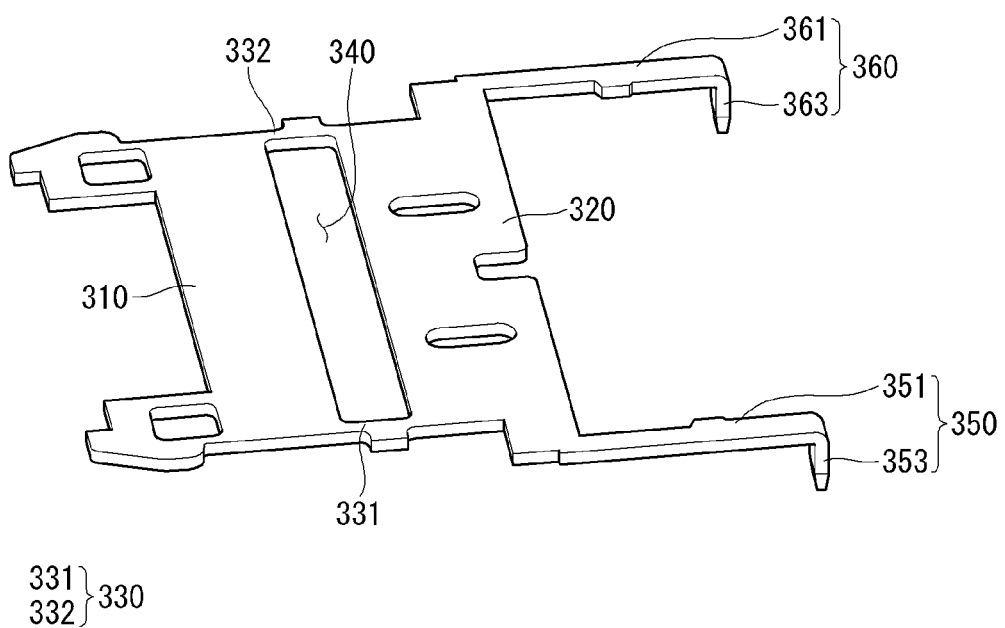
FIG. 6 is a view illustrating a frame according to an embodiment of the present invention.

FIG. 6 is a view illustrating a frame according to an embodiment of the present invention.

Referring to FIG. 6, the frame 300 may include a first frame 310 and a second frame 320. The first frame 310 and the second frame 320 may have a plate shape. The first frame 310 may be located on the plane substantially same as the second frame 320. The frame 300 may contain a metal. The frame 300 may provide stiffness to the body 500 (see FIG. 5).

The frame 300 may include a bridge 330. The bridge 330 may connect the first frame 310 and the second frame 330. The bridge 330 may include a first bridge 331 and a second bridge 331. The first bridge 331 may be spaced apart from the second bridge 332. The first frame 310, the first bridge 331, the second frame 320, and the second bridge 332 may be sequentially connected.

The frame hole 340 may be formed on the frame 300. The frame hole 340 may have a shape of a hole. The frame hole 340 may be formed by being surrounded by the first frame 310, the first bridge 331, the second frame 320, and the second bridge 332. The frame hole 340 may be located between the first bridge 331 and the second bridge 332. The frame hole 340 may be positioned between the first frame 310 and the second frame 320.

The body 500 (see FIG. 5) can be insert-injected together with the frame 300. The body 500 (see FIG. 5) may be located on both surfaces of the frame 300. For example, the body 500 (see FIG. 5) may be located on an upper surface and a lower surface of the frame 300. A portion of the first body 501 (see FIG. 5) located on the upper surface of the frame 300 may be referred to as a first upper body. Another portion of the first body 501 (see FIG. 5) located on the lower surface of the frame 300 may be referred to as a first lower body.

The frame hole 340 may provide a space in which the first upper body and the first lower body are connected to each other. For example, the first upper body can be connected to the first lower body at the frame hole 340.

The frame 300 may include a first leg 350 and a second leg 360. The first leg 350 may be adjacent to the first bridge 331. The first leg 350 may extend from the second frame 320 and may be spaced apart from the first frame 310. The first leg 350 may include a first part 351 and a second part 353. The first part 351 may be connected to the second frame 320. The first part 351 may be positioned substantially in the same plane as the second frame 320. The second part 353 may extend and be bent from the first part 351. For example, the second part 353 may be bent downward from the first part 351.

The second leg 360 may be adjacent to the second bridge 332. The second leg 360 may extend from the second frame 320 and may be spaced apart from the first frame 310. The second leg 360 may include a first part 361 and a second part 363. The first part 361 may be connected to the second frame 320. The first part 361 may be positioned substantially in the same plane as the second frame 320. The second part 363 may extend and be bent from the first part 361. For example, the second part 363 may be bent downward from the first part 361.

Figure 7:
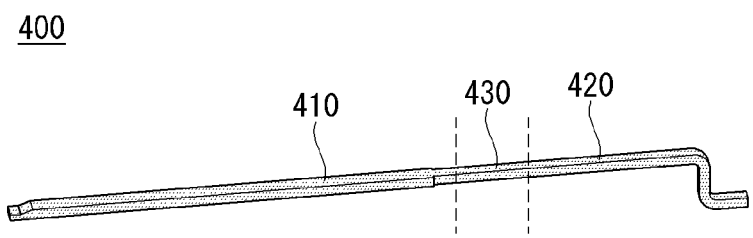
FIG. 7 is a view illustrating a pin according to an embodiment of the present invention.

FIG. 7 is a view illustrating a pin according to an embodiment of the present invention.

Referring to FIG. 7, the pin 400 may have the shape of a rod as a whole. The pin 400 may include an outer portion 410 and an inner portion 420, and an middle portion 430. The outer portion 410 may be mounted on the first body 501 (see FIG. 5). The outer portion 410 may have an elongated shape.

The inner portion 420 may be mounted on the second body 502 (see FIG. 5). The inner portion 420 may be curved. For example, the inner portion 420 may extend from the middle portion 430, may be bent downward and extend, and then may be bent rearward and extend.

The middle portion 430 may be positioned between the first body 501 (see FIG. 5) and the second body 502 (see FIG. 5). The middle portion 430 may be positioned between the outer portion 410 and the inner portion 420. The middle portion 430 may connect the outer portion 410 and the inner portion 420. The middle portion 430 may be wrapped by the packing unit 600 (see FIG. 5). The pin 400 may be electrically conductive. For example, pin 400 may contain a conductive metal. For example, the pin 400 may contain copper.

Figure 8:
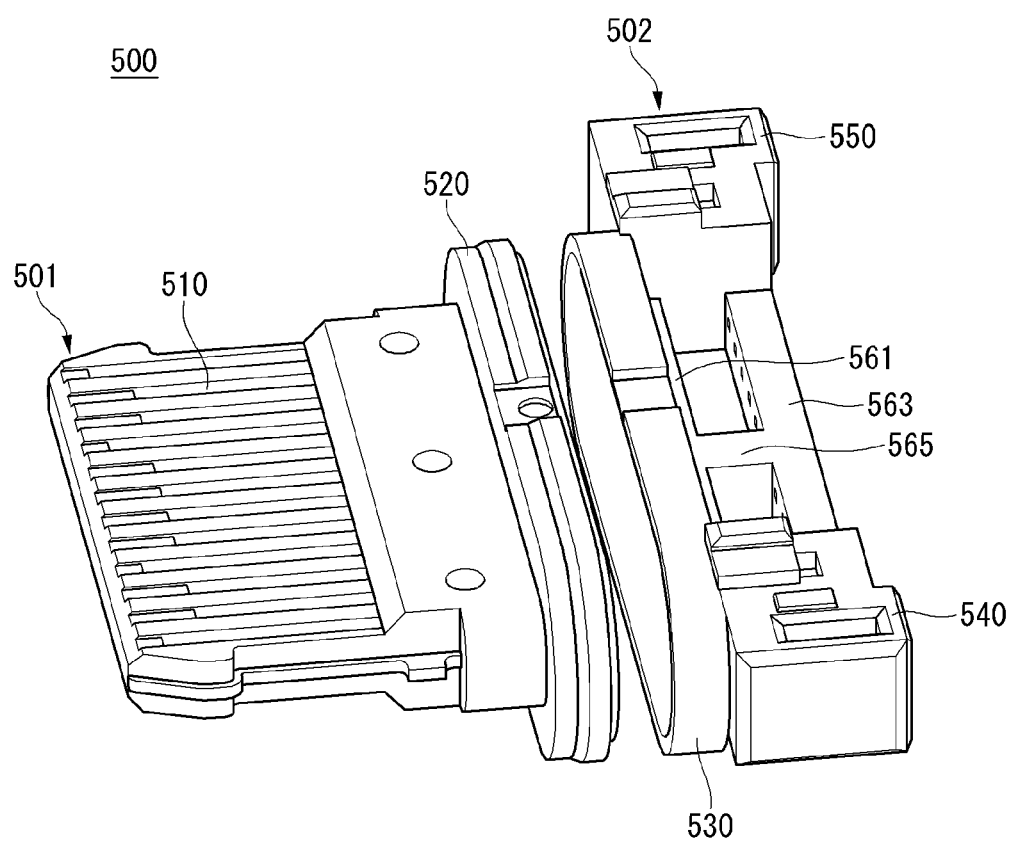
FIG. 8 is a view illustrating a body according to an embodiment of the present invention.

FIG. 8 is a view illustrating a body according to an embodiment of the present invention.

Referring to FIG. 8, the body 500 may include a first body 501 and a second body 502. The first body 501 may be spaced apart from the second body 502. The body 500 may be coupled to the frame 300 (see FIG. 6).

The first body 501 can be coupled to the first and second frames 310 and 320 (see FIG. 6) of the frame 300 (see FIG. 6). The second body 502 can be coupled to the first and second legs 350, 360 of the frame 300 (see FIG. 6).

The body 500 may be insert injected with the frame 300 (see FIG. 6) and the pin 400 (see FIG. 7). The first body 501 can be coupled to the upper surface or both surfaces of the frame 300 (see FIG. 6). For example, the portion of the first body 501 located on the upper surface of the frame 300 (see FIG. 6) may be connected to the other portion of the first body 501 located on the lower surface of the frame 300 (see FIG. 6), at the frame hole 340 (see FIG. 6).

The first body 501 may include a seating portion 510. The seat portion 510 can receive the outer portion 410 (see FIG. 7) of the pin 400 (see FIG. 7). The seating portion 510 may have a shape corresponding to the outer portion 410 (see FIG. 7) of the pin 400 (see FIG. 7). For example, the seating portion 510 may have the shape of a slender groove. The seating portion 510 may be formed at a plurality of places. For example, the seating portions 510 may be provided corresponding to the number of pins 400 (see FIG. 7). The seating portions 510 may be formed on the upper surface or both surfaces of the first body 501.

The outer portion 410 (see FIG. 7) of the pin 400 (see FIG. 7) may be referred to as the first portion 410 (see FIG. 7) of the pin 400 (see FIG. 7). The first portion 410 (see FIG. 7) of the pin 400 (see FIG. 7) may be exposed at the first body 501.

The first body 501 may include a first contact portion 520. The first contact portion 520 may be coupled to the second frame 320 (see FIG. 6). The first contact portion 520 may be located in the hollow portion formed in the housing 700 (see FIG. 5). The first contact portion 520 may face the inner surface forming the hollow portion of the housing 700 (see FIG. 5). The first contact portion 520 may be in close contact with the inner surface of the housing 700 (see FIG. 5).

The second body 502 may include a second contact portion 530. The second contact portion 530 may be spaced apart from the first contact portion 520. The second contact portion 530 may face the first contact portion 520. The second contact portion 530 may face the inner surface of the housing 700 (see FIG. 5). The second contact portion 530 may be in close contact with the inner surface of the housing 700 (see FIG. 5). The second contact portion 530 may be coupled to the first and second legs 350, 360 of the frame 300 (see FIG. 6).

The inner portion 420 (see FIG. 7) of the pin 400 (see FIG. 7) may be the second portion 420 (see FIG. 7) of the pin 400 (see FIG. 7). The second portion 420 (see FIG. 7) of the pin 400 (see FIG. 7) may be exposed at the second body 502.

The second body 502 may include a first stopper 540 and a second stopper 550. The first stopper 540 may be coupled to the first leg 350 of the frame 300 (see FIG. 6). The second stopper 550 may be coupled to the second leg 360 of the frame 300 (see FIG. 6). The first stopper 540 may be spaced apart from the second stopper 550. The stoppers 540 and 550 may be located at outside of the second opening OPN2 of the housing 700 (see FIG. 5). The stoppers 540 and 550 may be located adjacent to the second opening OPN2 of the housing 700 (see FIG. 5).

The second body 502 may include a first beam 561. The first beam 561 may be positioned between the first stopper 540 and the second stopper 550. The first beam 561 may connect the first stopper 540 and the second stopper 550. The first beam 561 may be located behind the second contact portion 530. The first beam 561 may be connected to the rear surface of the second contact portion 530.

The second body 502 may include a second beam 563. The second beam 563 may be positioned between the first stopper 540 and the second stopper 550. The second beam 563 may connect the first stopper 540 and the second stopper 550. The second beam 563 may be located behind the first beam 561. The second beam 563 may be spaced apart from the first beam 561.

The second body 502 may include a third beam 565. The third beam 565 may be positioned between the first stopper 540 and the second stopper 550. The third beam 565 may be positioned between the first beam 561 and the second beam 563. The third beam 565 may connect the first stopper 540 and the second stopper 550. The third beam 565 may couple the first beam 561 and the second beam 563. The first to third beams 561, 563 and 565 may provide stiffness (or supporting force) between the stoppers 540 and 550 and the second contact portion 530.

Figure 9:
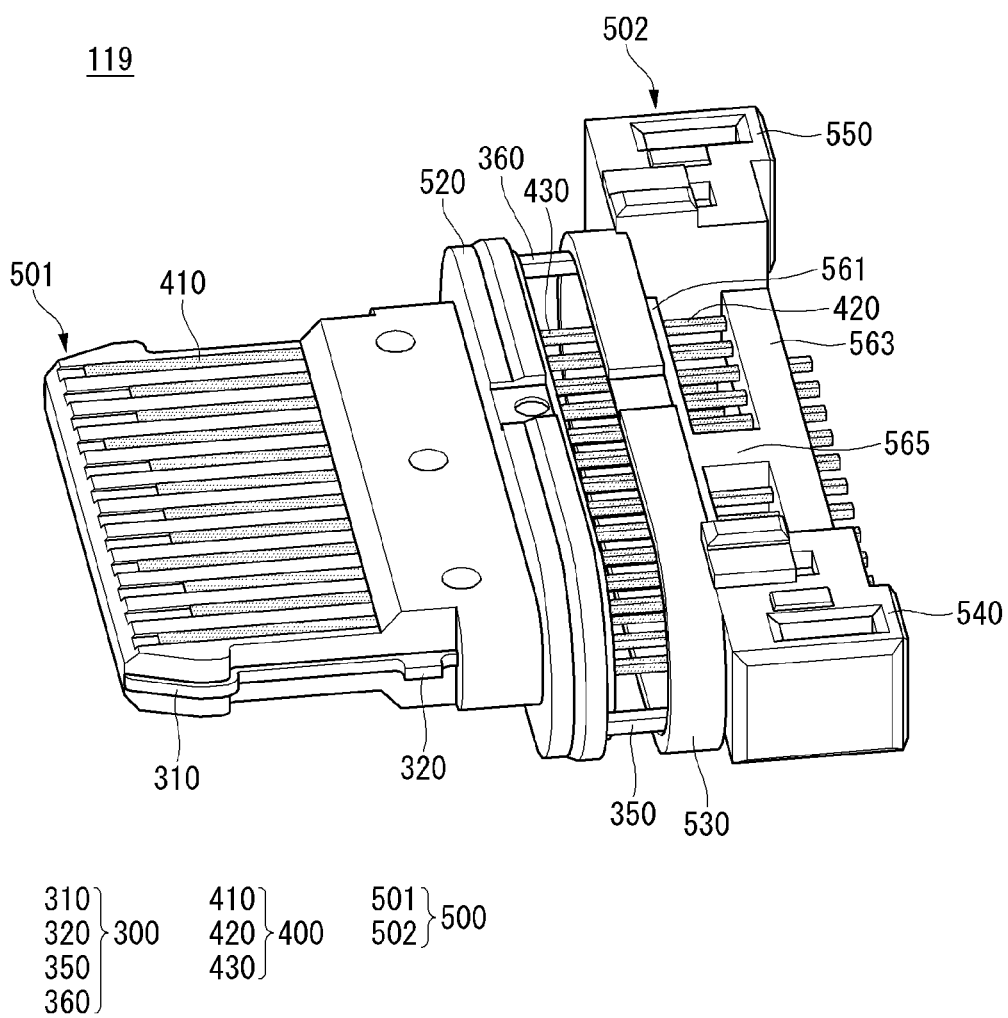
FIG. 9 is a view illustrating an input-output port of which a frame, a pin, and a body according to an embodiment of the present invention are coupled together.

FIG. 9 is a view illustrating an input-output port of which a frame, a pin, and a body according to an embodiment of the present invention are coupled together. The input-output port 119 of which the frame, the pin, and the body are coupled together may be referred to as a first input-output port 119.

Referring to FIG. 9, the body 500 may be insert-injected together with the pin 400 and the frame 300. The body 500 may include plastic. The body 500 may be positioned on the top (upper) and bottom (lower) surfaces of the frame 300. The frame 300 may connect the first body 501 and the second body 502. For example, the first leg 350 and the second leg 360 of the frame 300 may connect the first body 501 and the second body 502. The frame 300 may provide stiffness and/or supporting forces to the body 500.

The pin 400 may penetrate the body 500. The outer portion 410 of the pin 400 may be seated on the first body 501. A plurality of pins 400 may be provided. The plurality of pins 400 may be spaced apart from one another. The plurality of pins 400 may be electrically separated from each other. The pin 400 may be disposed between the first stopper 540 and the second stopper 550. The pin 400 may be disposed between the first leg 350 and the second leg 360. The pin 400 may be supported from the body 500.

A surface of the first contact portion 520 facing the second adhered portion 530 may be referred to as a first facing surface. A surface of the second tight contact portion 530 facing the first contact contact portion 520 may be referred to as a second facing surface. The first facing surface and the second second facing surface may be etched. For example, the first facing surface and the second facing surface may be laser-etched. When the first facing surface and the second facing surface are etched, the first facing surface and the second facing surface may be roughened.

The middle portion 430 of the pin 400 may be disposed between the first contact portion 520 and the second contact portion 530. A portion of the first and second legs 350 and 360 of the frame 300 may be disposed between the first and second contact portions 520 and 520. The portion of the first and second legs 350 and 360 disposed between the first and second contact portions 520 and 530 may be referred to as a leg exposing portion 350 or 360. The middle portion 430 of the pin 400 and the leg exposing portions 350 and 360 may undergo a primer application process. That is, a primer can be applied to the middle portion 430 of the pin 400 and the leg exposing portions 350 and 360. The primer may include synthetic resin, solvent, and additive.

Figure 10:
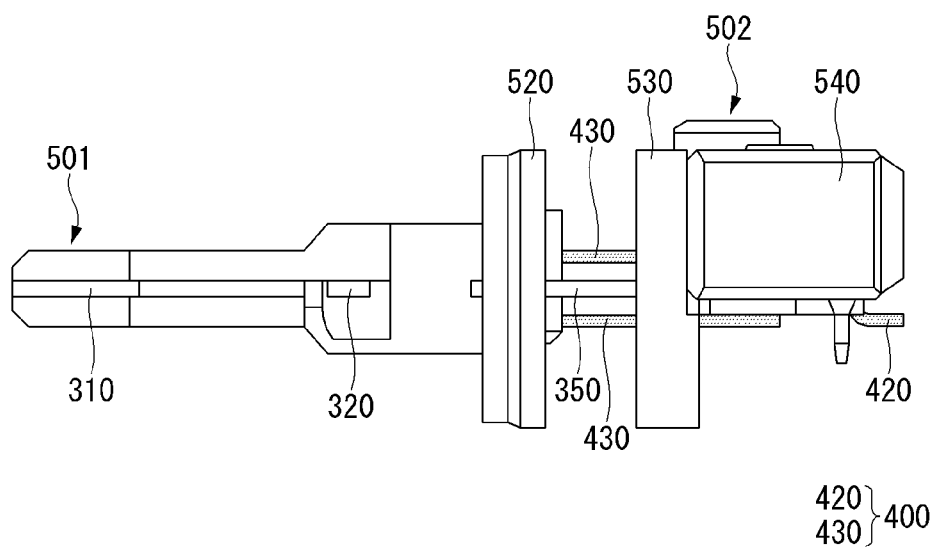
FIG. 10 is a side view of the input-output port of FIG. 9.

FIG. 10 is a side view of the input-output port of FIG. 9.

Referring to FIG. 10, the first body 501 may cover the top (upper) and bottom (lower) surfaces of the frame 300. For example, the first body 501 may cover the upper and lower surfaces of the first and second frames 310 and 320.

The first contact portion 520 may form an end of the first body 501. The second contact portion 530 may form an end of the second body 502. The first contact portion 520 may face the second tight contact portion 530.

The outer circumferential surface of the first contact portion 520 may correspond to the outer circumferential surface of the second contact portion 530. For example, the outer circumferential surface of the first contact portion 520 may have substantially the same locus as the outer circumferential surface of the second contact portion 530.

The pin 430 may traverse the first body 501 and the second body 502. For example, the middle portion 430 of the pin 430 may be positioned between the first body 501 and the second body 502. The packing unit 600 (see FIG. 5) may wrap around the middle portion 430 of the pin 400. The pins 430 may be disposed on top of the frame 300. The pin 430 may be disposed on bottom of the frame 300.

Figure 11:
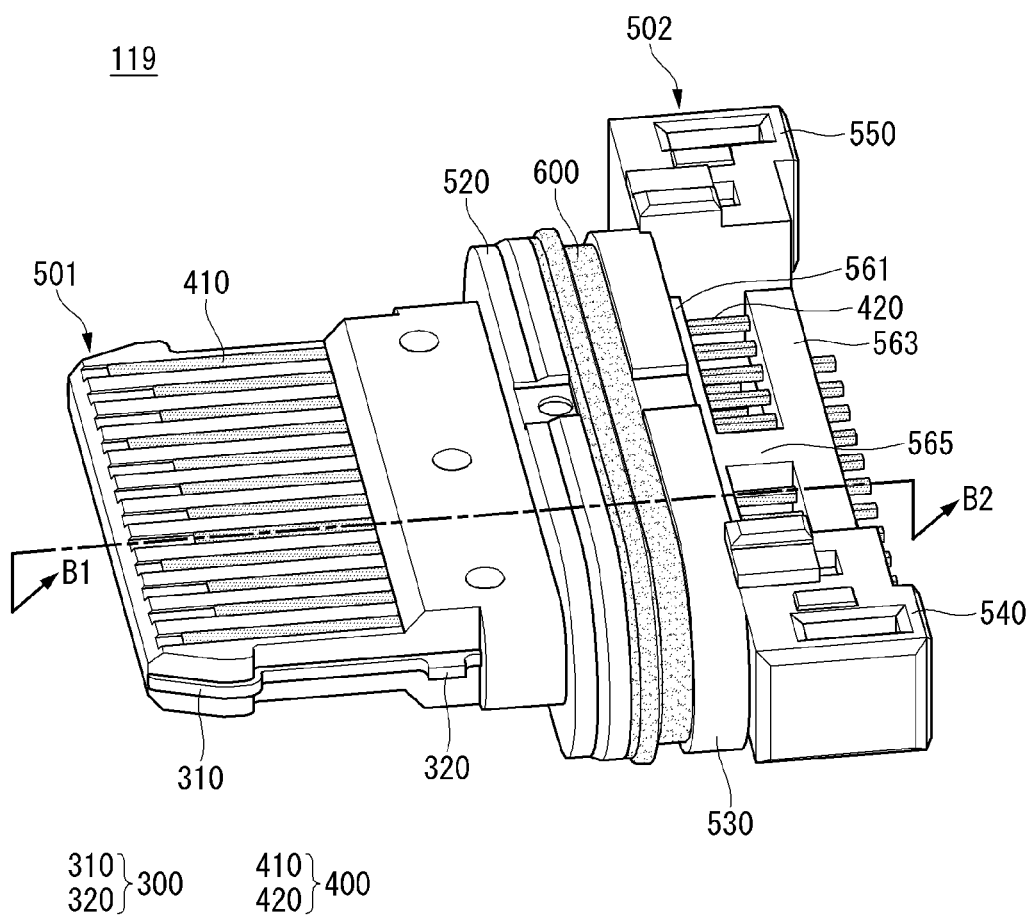
FIG. 11 is a view illustrating an input-output port of which a frame, a pin, a body, and a packing unit according to an embodiment of the present invention are coupled together.
Figure 12:
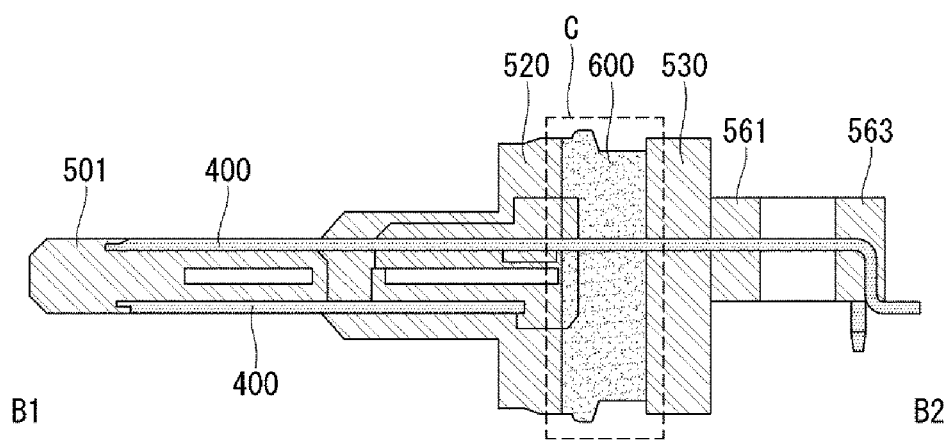
FIG. 12 is a cross-sectional view of the input-output port of FIG. 11 taken along line B1-B2.

FIG. 11 is a view illustrating an input-output port of which a frame, a pin, a body, and a packing unit according to an embodiment of the present invention are coupled together. FIG. 12 is a cross-sectional view of the input-output port of FIG. 11 taken along line B1-B2. The input-output port of which a frame, a pin, a body, and a packing unit according to an embodiment of the present invention are coupled together may be referred to as a second input/output port 119.

Referring to FIGS. 11 and 12, the packing unit 600 may be insert-injected together with the first input-output port 119. The packing unit 600 may contain plastic. For example, the packing unit 600 may contain a thermoplastic polyurethane (TPU). For example, the packing unit 600 may contain silicone.

The melting point of the packing unit 600 may be lower than the melting point of the body 500. The packing unit 600 may have heat resistance. For example, the packing unit 600 can preserve the shape at a temperature of 200 degrees Celsius or more.

The packing unit 600 may be positioned between the first body 501 and the second body 502. The packing unit 600 may couple the first body 501 and the second body 502 together. The first facing surface of the first contact portion 520 may have a rough surface by etching treatment. The first contact portion 520 can be more firmly coupled to the packing unit 600 by the etching treatment of the first facing surface.

The second facing surface of the second contact portion 530 may have a rough surface by etching treatment. The second contact portion 530 can be more firmly coupled to the packing unit 600 by the etching treatment of the second facing surface.

The packing unit 600 can engage with the middle portion 430 of the pin 400. The middle portion 430 of the pin 400 may undergo a primer application process. The middle portion 430 of the pin 400 can be more firmly coupled to the packing unit 600 by the primer application process.

Figure 13:
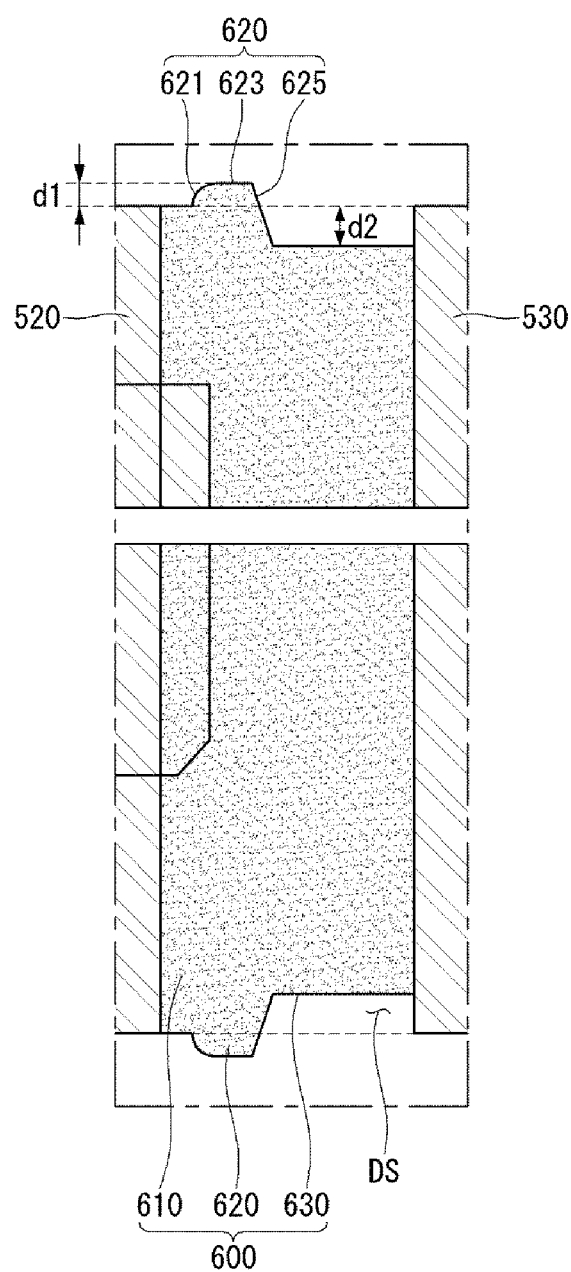
FIG. 13 is a view showing a region C in FIG. 12.

FIG. 13 is a view showing a region C in FIG. 12.

Referring to FIG. 13, a packing unit 600 according to an embodiment of the present invention may include a core 610, a protrusion 620, and a depression 630.

The core 610 may be positioned between the first contact portion 520 and the second contact portion 530. The core 610 may surround and support the frame 300 (see FIG. 11) and the pin 400 (see FIG. 11).

The protrusion 620 may extend from the core 610. The protrusion 620 may protrude outward from the core 610. For example, the protrusion 620 may protrude from the core 610 as much as a first distance d1. The protrusion 620 may be further adjacent to the first contact portion 520.

The protrusion 620 may form a front surface 621, an upper surface 623, and a rear surface 625. The front surface 621 of the protrusion 620 may be inclined with respect to the front. The upper surface 623 may extend rearward from the front surface 621. The rear surface 625 may extend from the top surface 623. The rear surface 625 can face rearward.

The depression 630 may extend from the rear surface 625 of the protrusion 620. The depression 630 may be positioned between the protrusion 620 and the second contact portion 530. The depression 630 may be recessed inwardly from the core 610. For example, the depression 630 may be recessed as much as a second distance d2 from the core 610. The depression 630 may be further adjacent to the second contact portion 530. The depression 630 may lead to the second contact portion 530. The depression 630 may form a step with the second contact portion 530. For example, the depression 630 may form a stepped portion as much as a second distance d2 from the second contact portion 530.

The space formed by the depression 630 can be referred to as a depressed space DS. The depressed space DS can provide a space in which the protrusion 620 is pushed backward in the process of fitting the second input-output port 119 into the housing 700 (see FIG. 5). When the protrusion 620 is pushed backward, the area of the protrusion 620 in contact with the housing 700 (see FIG. 5) may become larger. Therefore, the depression 630 can improve the waterproof function of the input-output port 119.

Figure 14:
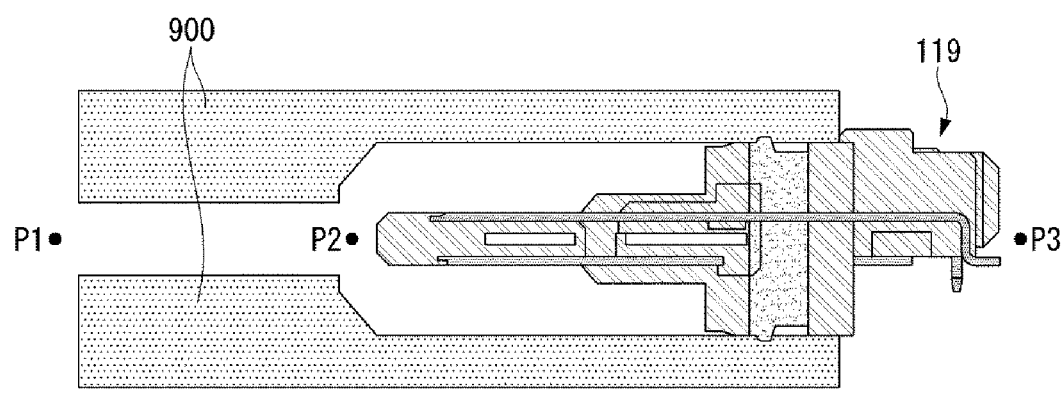
FIG. 14 is a view illustrating a test of the input-output port of FIG. 11.

FIG. 14 is a view illustrating a test of the input-output port of FIG. 11.

Referring to FIG. 14, the input-output port 119 can be fitted in the waterproof test apparatus 900. A part of the waterproof test apparatus 900 may correspond to the shape of the housing 700 (see FIG. 5). The input-output port 119 shown in FIG. 14 may be the second input-output port 119 shown in FIG. 11.

Fluid can be inflowed into the waterproof test apparatus 900. For example, the fluid may flow from the first point P1 toward the second point P2. The fluid can be air or water. The first point P1 may be outside of the waterproof test apparatus 900. The second point P2 may be inside of the waterproof test apparatus 900.

When the fluid flows from the first point P1 toward the second point P2, the pressure can be measured at the third point P3. By measuring the pressure at the third point P3, the waterproof function of the second input-output port 119 can be tested. For example, when the second input-output port 119 exhibits a waterproof function, the pressure at the third point P3 may not vary before and after the fluid flows. The third point P3 may be outside of the waterproof test apparatus 900. The third point P3 can be behind the input-output port 119. The second point P2 may be between the first point P1 and the third point P3.

Figure 15:
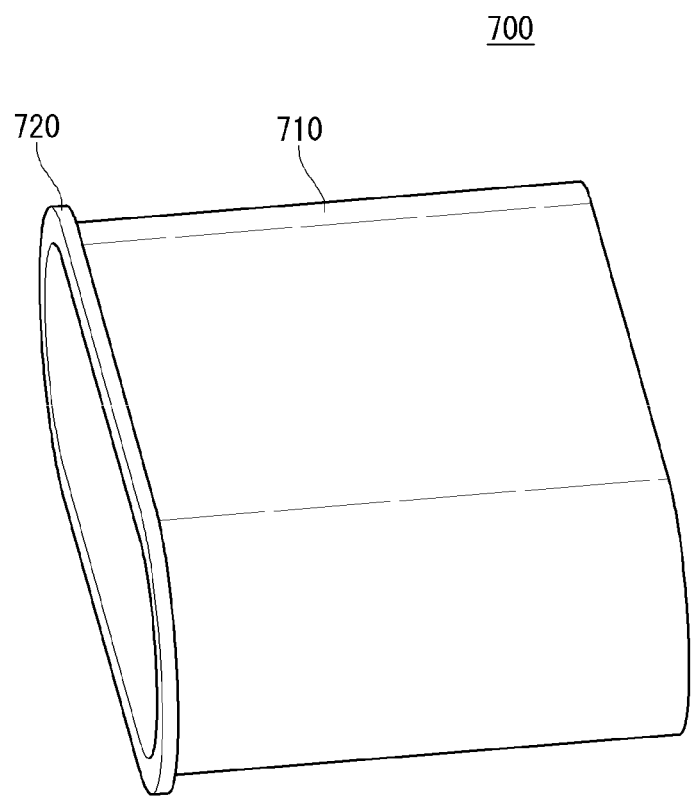
FIG. 15 is a view illustrating a housing according to an embodiment of the present invention.

FIG. 15 is a view illustrating a housing according to an embodiment of the present invention.

Referring to FIG. 15, the housing 700 may include a housing body 710. The housing body 710 may form a hollow portion HP (see FIG. 5). The housing body 710 can receive the second input-output port 119 (see FIG. 11). An end of the housing body 710 may form a second opening (OPN2, see FIG. 5).

The housing 700 may include a port inlet 720. The port inlet 720 may be formed at the other end of the housing 700. The port inlet 720 may form the first opening OPN1 (see FIG. 5). The port inlet 720 may be exposed to the outside of the terminal 10 (see FIG. 1).

FIGS. 16 to 21 are views related to a connection relationship between a housing coupling portion and a body according to various embodiments of the present invention.

Figure 16:
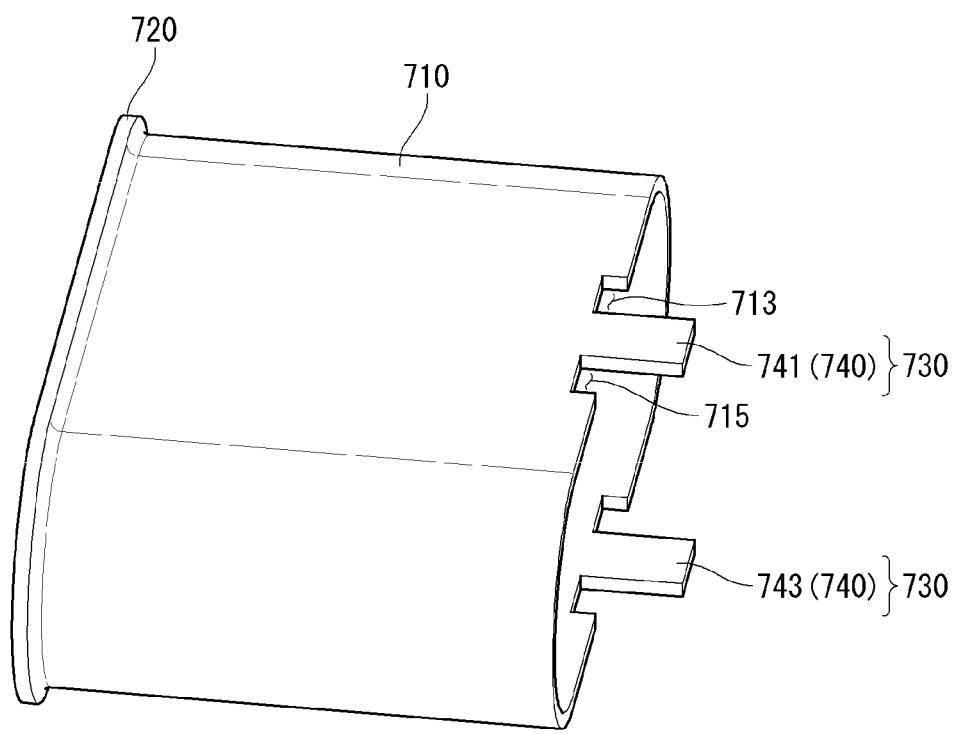
FIGS. 16 to 21 are views related to a connection relationship between a housing coupling portion and a body according to various embodiments of the present invention.

Referring to FIG. 16, the housing 700 may include a housing body 710, a port inlet 720, and a housing coupling portion 730. The housing coupling portion 730 may be located opposite the port inlet 720. The housing coupling portion 730 may include a latch 740.

The latch 740 may be provided in plurality. For example, the latch 740 may include a first latch 741 and a second latch 743. The latch 740 may protrude rearward from the housing body 710.

Grooves 713 and 715 may be formed at both sides of the latch 741. The grooves 713 and 715 may be formed in the housing body 710. The grooves 713 and 715 may have a depressed shape toward the port inlet 720. The grooves 713 and 715 may include a first groove 713 and a second groove 715.

The latch 741 may be located between the first groove 713 and the second groove 715. The length of the latch 741 in the front-rear direction can be greater than the length of the latch 741 protruding with respect to the housing body 710 as much as the length of the grooves 713 and 715. The length of the latch 741 required for the process (e.g., bending) of the latch 740 can be ensured while the volume due to the projection of the latch 740 is restricted.

Figure 17:
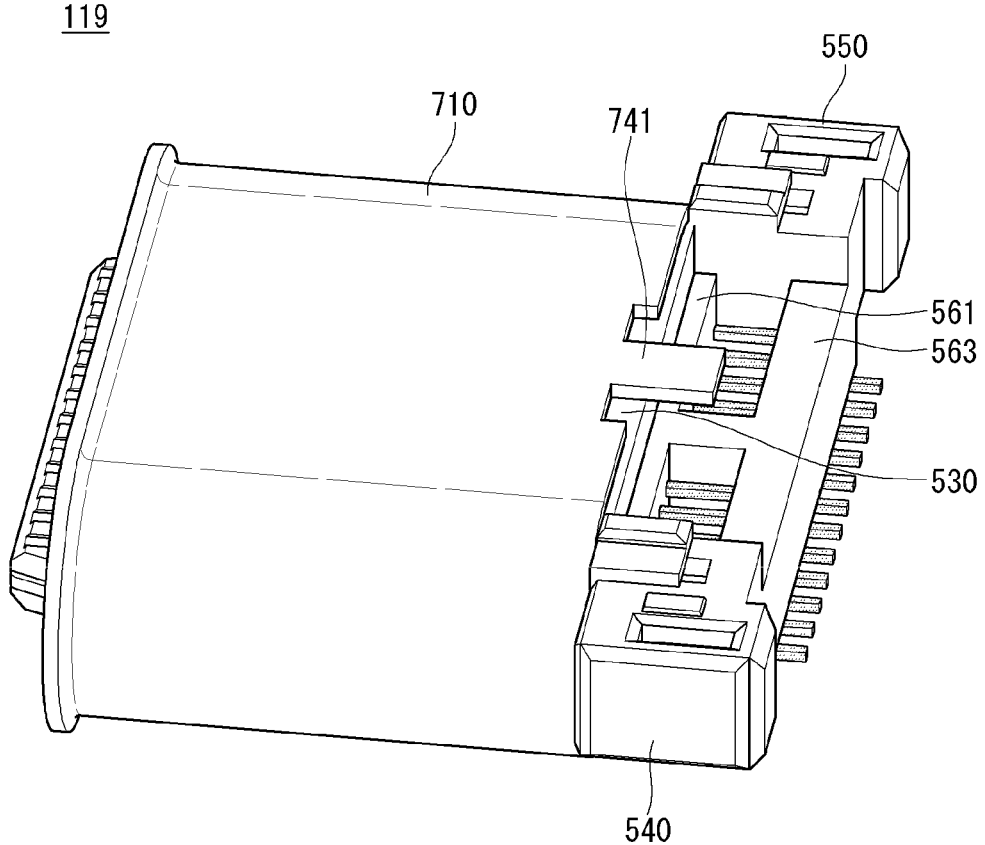

Referring to FIG. 17, the second input-output port 119 of FIG. 11 may be inserted into the housing 700 of FIG. 16. The latch 741 may be located at the second body 502. For example, the latch 741 may traverse the second contact portion 530. The latch 741 can be in contact with the second contact portion 530.

The length from the first stopper 540, via the beams 561 and 563, to the second stopper 550 may be greater than the width of the housing body 710. The first stopper 540 and the second stopper 550 can prevent the forward movement of the second input-output port 119. The forward movement of the second input-output port 119 can be with reference to the housing body 710.

Figure 18:
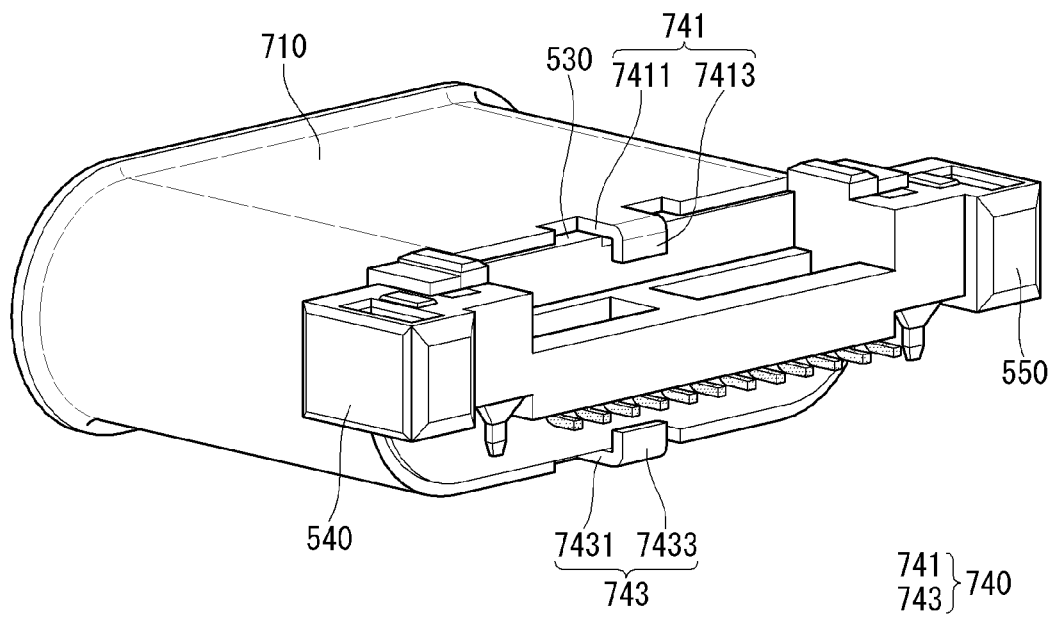

Referring to FIG. 18, the latch 740 may be bent. The latch 740 may include extension portions 7411 and 7431 and bending portions 7413 and 7433. The extension portions 7411 and 7431 may include a first extension portion 7411 and a second extension portion 7431. The bending portions 7413 and 7433 may include a first bending portion 7413 and a second bending portion 7433. The first latch 741 may include a first extension portion 7411 and a first bending portion 7413. The second latch 743 may include a second extension portion 7431 and a second bending portion 7433.

The extension portions 7411 and 7431 may extend from the housing body 710. The bending portions 7413 and 7433 can be bent and extended from the extension portions 7411 and 7413. The first bending portion 7413 can be bent toward the second bending portion 7433. The second bending portion 7433 can be bent toward the first bending portion 7413. The bending portions 7413 and 7433 can suppress the rearward movement of the second input-output port 119. The rearward movement of the second input-output port 119 can be with reference to the housing body 710.

Figure 19:
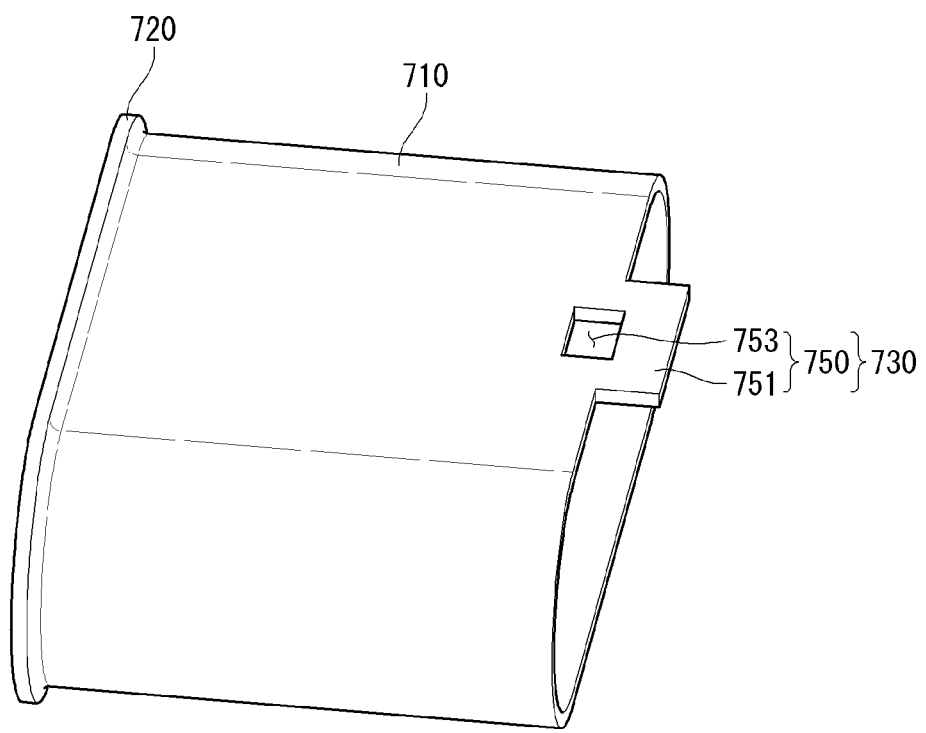

Referring to FIG. 19, the housing 700 may include a housing body 710, a port inlet 720, and a housing coupling portion 730. The housing coupling portion 730 may be located opposite the port inlet 720. The housing coupling portion 730 may include a second coupling portion 750.

The second coupling portion 750 may protrude rearward from the housing body 710. The second coupling portion 750 may include a guide 751 and a housing hole 753. The guide 751 may protrude rearward from the housing body 710. The housing hole 753 may be formed between the guide 751 and the port inlet 720. The housing hole 753 may be adjacent to the guide 751. The housing hole 753 can be formed at the guide 751. The housing hole 753 may be formed at the housing body 710. The housing hole 753 may be formed at the housing body 710 and the guide 751. The housing hole 753 may be formed at the boundary between the housing body 710 and the guide 751. The boundary between the housing body 710 and the guide 751 can be overlapped with the housing hole 753.

Figure 20:
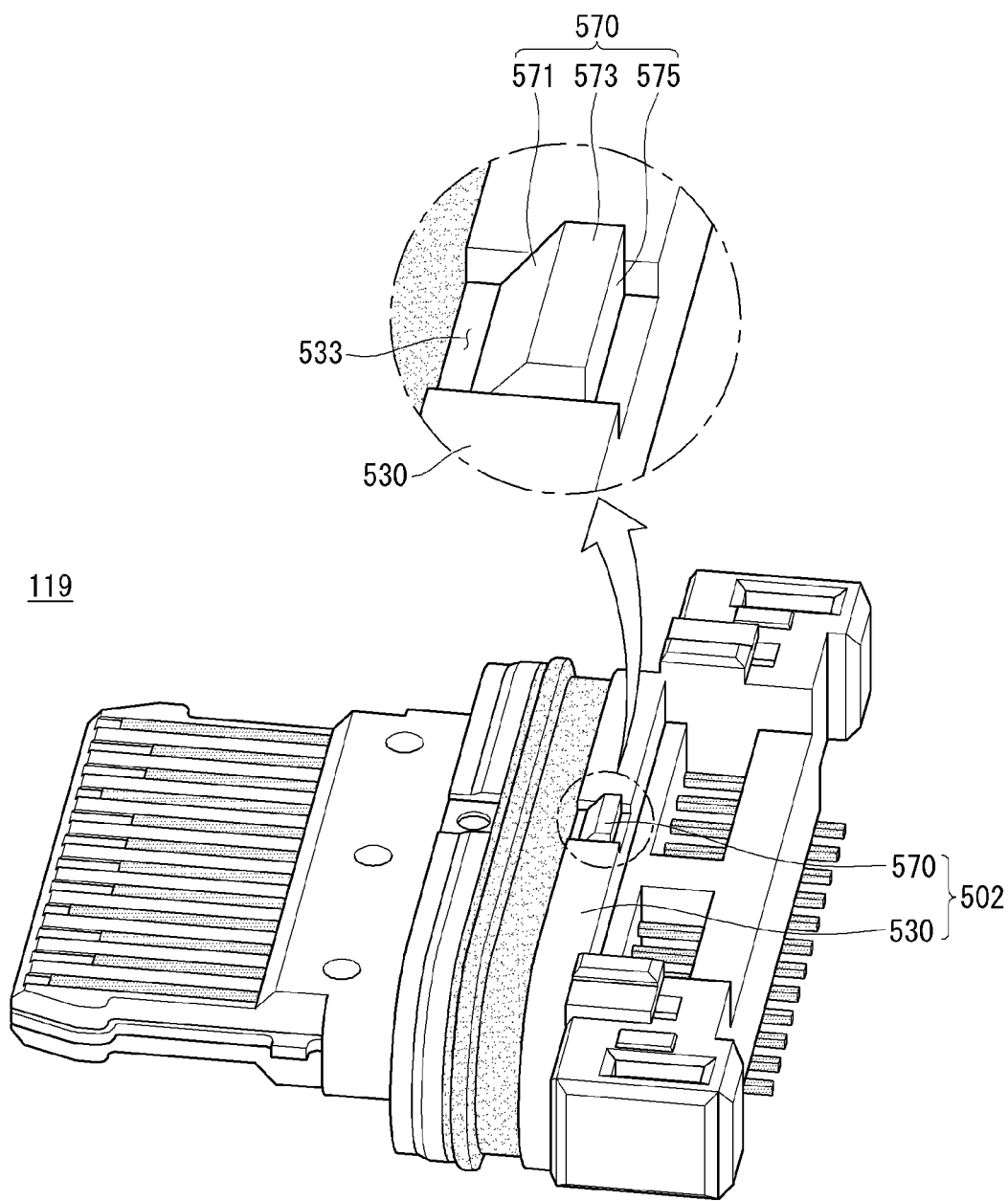

Referring to FIG. 20, the second body 502 may include a coupling protrusion 570. The coupling protrusion 570 may be formed on the second contact portion 530. The coupling protrusion 570 may protrude outward from the second contact portion 530. The input-output port 119 of which the coupling protrusion 570 formed on the second input-output port 119 of FIG. 11 may be referred to as a third input-output port 119.

The coupling protrusion 570 may form a guide surface 571, an upper surface 573, and a rear surface 575. The guide surface 571 can face forward obliquely. The guide surface 571 may be inclined with respect to a surface of the second contact portion 530 on which the coupling protrusion 570 is formed. The upper surface 573 may extend from the guide surface 571 and extend to the rear surface 575. The rear surface 575 may face rearward. When the coupling protrusion 570 is fitted in the housing hole 753 (see FIG. 19), the rear surface 575 of the coupling protrusion 570 can face the guide 751 (see FIG. 19).

The second contact portion 530 may include a second contact portion groove 533. The second contact portion groove 533 may be formed on the surface of the second contact portion 530. The coupling protrusion 570 may be adjacent to the second contact portion groove 533. The guide surface 571 may lead to the second contact portion groove 533. The second contact portion groove 533 can be positioned in front of the guide surface 571. The second contact portion groove 533 may be located between the coupling protrusion 570 and the packing unit 600.

Figure 21:
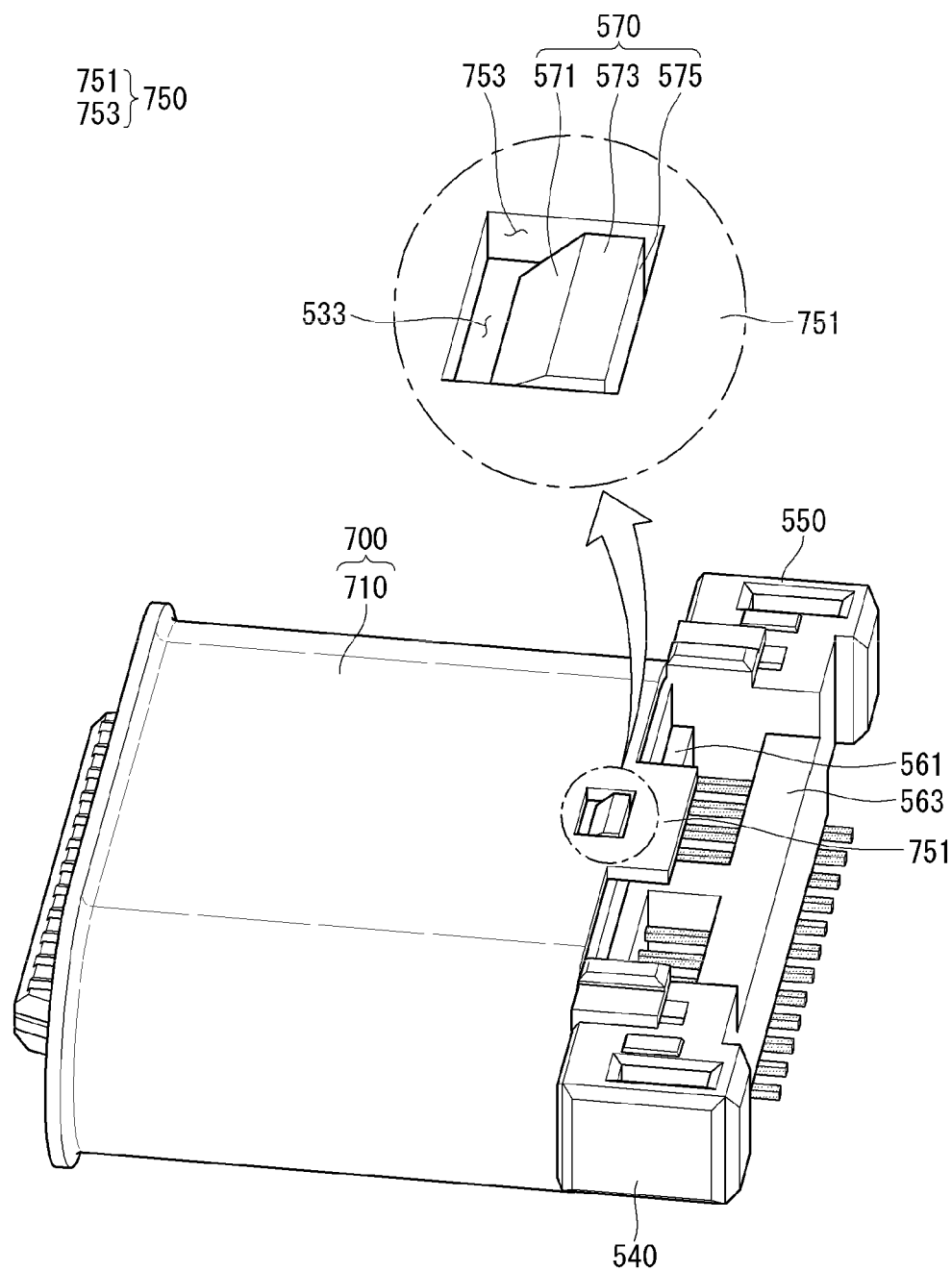

Referring to FIG. 21, the third input-output port 119 of FIG. 20 may be inserted into the housing 700 of FIG. 19. The coupling protrusion 570 may move under the guide 751 and be inserted into the housing hole 753. The guide 751 has elasticity and can have a restoring force. When the coupling protrusion 570 is located under the guide 751, the guide 751 may exert restoring force on the coupling protrusion 570. The guide surface 571 may be tapered with respect to the guide 751.

The coupling protrusion 570 fitted in the housing hole 753 can suppress the rearward movement of the third input-output port 119. The rearward movement of the third input-output port 119 can be with reference to the housing body 710.

The first stopper 540 and the second stopper 550 can inhibit the forward movement of the third input-output port 119. The forward movement of the third input-output port 119 can be with reference to the housing body 710.

The housing hole 753 can communicate with the second contact portion groove 533. The housing hole 753 and the second contact groove 533 (see FIG. 20) can provide a space at which the input-output port 119 is coupled to the rear case 102 (see FIG. 1).

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An input-output port, comprising:
   a housing including:
      a first opening;
      a second opening being spaced apart from the first opening; and
      a hollow portion being communicated with the first and second openings;
   a frame having a shape of a plate, the frame being positioned in the hollow portion;
   a body being combined with the frame and including:
      a first body being positioned in the hollow portion, adjacent to the first opening; and
      a second body being spaced apart from the first body, positioned in the hollow portion, adjacent to the second opening;
   a pin being accommodated in the body, the pin including:
      a first portion being accommodated in the first body, exposed on the first body; and
      a second portion being accommodated in the second body, exposed on the second body; and
   a packing unit being positioned between the first and second bodies, the packing unit being combined with the frame,
   wherein the packing unit includes:
      a core being positioned between the first body and the second body; and
      a protrusion protruding from the core, the protrusion being in contact with the housing, and
   wherein the packing unit further includes a depression being recessed inwardly from the core, and wherein the depression is positioned between the protrusion and the second body.

2. The input-output port of claim 1, wherein the first body includes a first contact portion accommodated in the housing, the first contact portion being adjacent to the packing unit,
   wherein the second body includes a second contact portion accommodated in the housing, the second contact portion being adjacent to the packing unit, and
   wherein the packing unit is positioned between the first contact portion and the second contact portion.

3. The input-output port of claim 2, wherein the depression is recessed and forms a stepped portion with reference to the second contact portion.

4. The input-output port of claim 2, wherein the housing includes:
   a housing body forming the hollow portion; and
   a housing coupling portion being extended from the housing body, the housing coupling portion being adjacent to the second opening, the housing coupling portion being coupled to the second body.

5. The input-output port of claim 4, wherein the housing coupling portion includes a latch extended from the housing body,
   wherein the latch includes:
   a extension portion being extended from the housing body in a first direction; and
   a bending portion being bent from the extension portion, wherein the first direction is a direction from the first body toward the second body, and
   wherein the latch hooks the second contact portion.

6. The input-output port of claim 5, wherein the latch includes:
   a first latch being extended from the housing body; and
   a second latch being extended from the housing body, the second latch being positioned opposite to the first latch.

7. The input-output port of claim 5, wherein the housing body includes first and second grooves being recessed at the second opening in a second direction, wherein the latch is positioned between the first groove and the second groove, and wherein the second direction is a direction from the second body toward the first body.

8. The input-output port of claim 4, wherein the housing coupling portion includes a second coupling portion, wherein the second coupling portion includes:

a guide being extended from the second opening in a first direction; and a housing hole being formed at a boundary between the guide and the housing body, wherein the second body includes a coupling protrusion protruding from the second contact portion, the coupling protrusion being fitted in the housing hole, and wherein the first direction is a direction from the first body toward the second body.

9. The input-output port of claim 8, wherein the coupling protrusion includes:

a guide surface facing the first body obliquely, the guide surface being extended from the second contact portion; and a rear surface facing the guide, the rear surface being extended from the second contact portion.

10. The input-output port of claim 9, wherein the second contact portion includes a second contact portion groove being recessed inwardly, and wherein the second contact portion groove is adjacent to the coupling protrusion.

11. The input-output port of claim 10, wherein the second contact portion groove is positioned between the packing unit and the coupling protrusion.

12. An input-output port, comprising:

a housing including:
  a first opening;
  a second opening being spaced apart from the first opening; and
  a hollow portion being communicated with the first and second openings;

a frame having a shape of a plate, the frame being positioned in the hollow portion;

a body being combined with the frame and including:
  a first body being positioned in the hollow portion, adjacent to the first opening; and
  a second body being spaced apart from the first body, positioned in the hollow portion, adjacent to the second opening;

a pin being accommodated in the body, the pin including:
  a first portion being accommodated in the first body, exposed on the first body; and
  a second portion being accommodated in the second body, exposed on the second body; and a packing unit being positioned between the first and second bodies, the packing unit being combined with the frame, wherein the frame includes:
  a first frame being coupled to the first body, the first frame being adjacent to the first opening;
  a second frame being coupled to the first body, the second frame being positioned between the first frame and the second body; and
  a frame hole being formed between the first frame and the second frame, wherein the first body includes:
  a first upper body being located at upper side of the frame; and
  a first lower body being located at lower side of the frame, and wherein the first upper body is connected to the first lower body through the frame hole, wherein the frame includes:
  a first leg being extended from the second frame toward the second body, the first leg being coupled to the second body; and
  a second leg being extended from the second frame toward the second body, the second leg being coupled to the second body, the second leg being spaced apart from the first leg, wherein the pin is positioned between the first leg and the second leg, and wherein the second body includes:
  a first stopper being adjacent to the first leg, the first stopper being positioned at an outside of the second opening; and
  a second stopper being adjacent to the second leg, the second stopper being positioned at the outside of the second opening, the second stopper being spaced apart from the first stopper.

13. The input-output port of claim 12, wherein the second body includes a first beam, and wherein the first beam couples the first stopper with the second stopper.

14. A mobile terminal comprising:

a front case;

a rear case being coupled to a rear portion of the front case; and a display unit being coupled to the front case, the display unit displaying an image forwardly, wherein an input-output port is coupled to the rear case, and wherein the input-output port comprises:

a housing including:
  a first opening;
  a second opening being spaced apart from the first opening; and
  a hollow portion being communicated with the first and second openings;

a frame having a shape of a plate, the frame being positioned in the hollow portion;

a body being combined with the frame and including:
  a first body being positioned in the hollow portion, adjacent to the first opening; and
  a second body being spaced apart from the first body, positioned in the hollow portion, adjacent to the second opening;

a pin being accommodated in the body, the pin including:
  a first portion being accommodated in the first body, exposed on the first body; and
  a second portion being accommodated in the second body, exposed on the second body; and a packing unit being positioned between the first and second bodies, the packing unit being combined with the frame, wherein the packing unit includes:
  a core being positioned between the first body and the second body; and
  a protrusion protruding from the core, the protrusion being in contact with the housing, and wherein the packing unit further includes a depression being recessed inwardly from the core, and wherein the depression is positioned between the protrusion and the second body.

* * * * *